US012606675B2

(12) United States Patent
Oyaizu et al.

(10) Patent No.: US 12,606,675 B2
(45) **Date of Patent: *Apr. 21, 2026**

(54) SULFUR-CONTAINING POLYMER, METHOD FOR PRODUCING SAME, AND SULFUR-CONTAINING POLYMER COMPOSITION

(71) Applicant: NIPPON SHOKUBAI CO., LTD., Osaka (JP)

(72) Inventors: Kenichi Oyaizu, Tokyo (JP); Kanta Matsushima, Tokyo (JP); Seigo Watanabe, Tokyo (JP); Teru Takayama, Tokyo (JP); Hiromichi Nishio, Tokyo (JP); Tomohiro Miura, Tokyo (JP); Jun-ichi Nakamura, Osaka (JP); Takeo Kawase, Osaka (JP); Teruhisa Fujibayashi, Osaka (JP); Junya Kimura, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 478 days.

This patent is subject to a terminal disclaimer.

(21) Appl. No.: 18/246,124

(22) PCT Filed: Sep. 22, 2021

(86) PCT No.: PCT/JP2021/034860

§ 371 (c)(1),
(2) Date: Mar. 21, 2023

(87) PCT Pub. No.: WO2022/065381

PCT Pub. Date: Mar. 31, 2022

(65) Prior Publication Data

US 2023/0357507 A1 Nov. 9, 2023

(30) Foreign Application Priority Data

Sep. 24, 2020 (JP) ................................ 2020-160170
Mar. 18, 2021 (JP) ................................ 2021-045174

(51) Int. Cl.

*C08G 75/0268* (2016.01)
*C08G 75/029* (2016.01)
*G02B 1/04* (2006.01)

(52) U.S. Cl.

CPC ....... *C08G 75/0268* (2013.01); *C08G 75/029* (2013.01); *G02B 1/04* (2013.01)

(58) Field of Classification Search

CPC ...... C08G 75/23; C08G 75/268; C08G 75/29; C08G 2261/3444; C08L 81/06; G02B 1/04

See application file for complete search history.

(56) References Cited

U.S. PATENT DOCUMENTS 5,144,004 A 9/1992 Bobsein
5,451,438 A 9/1995 Teramoto et al.

(Continued)

FOREIGN PATENT DOCUMENTS

CN 103180367 6/2013
CN 103222095 7/2013

(Continued)

OTHER PUBLICATIONS

Shima, Masahide, "Introduction to XPS Analysis for Beginners", Journal of Surface Analysis, vol. 26, No. 1, (2019), pp. 41-48—Abstract.

(Continued)

*Primary Examiner* — Shane Fang
(74) *Attorney, Agent, or Firm* — HSML P.C.

(57) ABSTRACT

The present invention aims to provide a polymer material that has a high refractive index and can be suitably used for applications such as optical applications. The present invention relates to the sulfur-containing polymer containing at least one structural unit selected from the group consisting (Continued)

of a structural unit (A) represented by the following formula (1), a structural unit (B) represented by the following formula (2), and a structural unit (C) represented by the following formula (3); and a reactive functional group,

[Chem. 1]

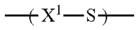

(1)

[Chem. 2]

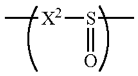

(2)

[Chem. 3]

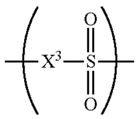

(3)

wherein $X^1$, $X^2$, and $X^3$ are the same as or different from each other and are each an optionally substituted divalent aromatic hydrocarbon group.

11 Claims, 8 Drawing Sheets

(56) References Cited

U.S. PATENT DOCUMENTS

| | | | |
|---|---|---|---|
| 5,907,029 | A | 5/1999 | Disch et al. |
| 6,013,791 | A | 1/2000 | Zierer et al. |
| 2009/0002613 | A1 | 1/2009 | Kim et al. |
| 2011/0046285 | A1 | 2/2011 | Imai et al. |
| 2013/0184428 | A1 | 7/2013 | Fedurco |
| 2013/0225771 | A1 | 8/2013 | Kanomata et al. |
| 2014/0288263 | A1 | 9/2014 | Kanomata et al. |
| 2018/0057635 | A1 | 3/2018 | Araki et al. |
| 2019/0040202 | A1* | 2/2019 | Ho ........................ C07C 317/22 |
| 2020/0157284 | A1 | 5/2020 | Araki et al. |
| 2020/0347186 | A1* | 11/2020 | Li ...................... C08G 75/0213 |
| 2022/0289912 | A1 | 9/2022 | Oyaizu et al. |

FOREIGN PATENT DOCUMENTS

| | | |
|---|---|---|
| CN | 109608638 | 4/2019 |
| EP | 0 621 301 | 10/1994 |
| JP | 2-080458 | 3/1990 |
| JP | 4-169568 | 6/1992 |
| JP | 9-059382 | 3/1997 |
| JP | 10-101799 | 4/1998 |
| JP | 10-306162 | 11/1998 |
| JP | 2000-080166 | 3/2000 |
| JP | 2003-277460 | 10/2003 |
| JP | 2003-335842 | 11/2003 |
| JP | 2007-119756 | 5/2007 |
| JP | 2008-074989 | 4/2008 |
| JP | 2009-523260 | 6/2009 |
| JP | 2009-167316 | 7/2009 |
| JP | 2010-043191 | 2/2010 |
| JP | 2013-539458 | 10/2013 |
| JP | 2015-168790 | 9/2015 |
| JP | 2017-052834 | 3/2017 |
| JP | 2018-035229 | 3/2018 |
| JP | 2022-530391 | 6/2022 |
| TW | 201809101 | 3/2018 |
| WO | 94/010226 | 5/1994 |
| WO | 2012/057319 | 5/2012 |
| WO | 2016/136738 | 9/2016 |
| WO | 2017/130798 | 8/2017 |
| WO | 2020/216614 | 10/2020 |
| WO | 2021/040014 | 3/2021 |

OTHER PUBLICATIONS

Synthesis chemistry of Oyaizu Kenichi, high-purity polyphenylene sulfide, ENEOS Technical Review , vol. 59, No. Feb. 1, 2017, pp. 11-14—Please see the JP Office Action for the concise explanation of this document (this document is referred to as Document 3 in the Japanese Office Action).

English translation of the Office Action issued in corresponding Japanese Patent Application Serial No. 2023-060064, Apr. 9, 2024, 6 pages.

Ibiden Engineering, "X-ray Photoelectron Spectroscopy", Principle of XPS (ESCA) obtained from https://www.ibieng.co.jp/analysis-solution/x0031/) retrieved Aug. 16, 2024, 6 pages w/translation.

Kagaku, et al., "Introduction to Instrumental Analysis Exploring the Periphery of Electrochemistry X-ray Photoelectron Spectroscopy (XPS or ESCA)", Electrochemistry and Industrial Physical Chemistry, The Society of Electrochemical Engineers vol. 59, No. 8 (1991) pp. 673-678, 12 pages w/translation.

Written Opinion submitted to the Japanese Patent Office in corresponding Japanese Application No. 2022-552041, Oct. 28, 2024, 9 pages w/translation.

* cited by examiner

Experiment Example 3-1 | Experiment Example 3-4 | Experiment Example 3-5

SULFUR-CONTAINING POLYMER, METHOD FOR PRODUCING SAME, AND SULFUR-CONTAINING POLYMER COMPOSITION

TECHNICAL FIELD

The present invention relates to sulfur-containing polymers, methods for producing the same, and sulfur-containing polymer compositions. Specifically, the present invention relates to a sulfur-containing polymer having a high refractive index, a method for producing the same, and a sulfur-containing polymer composition.

BACKGROUND ART

Known high refractive index materials include polycarbonate containing an aromatic ring and polymer materials having a fluorene skeleton. Refractive index regulating materials that improve light extraction efficiency of LEDs and imaging lens materials are required to have a large Abbe number, i.e., to cause less light dispersion. As such materials having a high refractive index and causing less light dispersion, materials containing sulfur molecules or halogen molecules and materials containing metal oxide nanoparticles have been developed, for example.

Various sulfur-containing materials having a high refractive index and causing less light dispersion have been examined before. For example, Patent Literature 1 describes a polymer material having a repeating unit containing in the main chain a sulfur atom and a benzene ring in which two hydrogen atoms are replaced with methyl groups and having a degree of dispersibility of 3.0 or higher, wherein the polymer material has excellent moldability in the form of a solution.

Further, for example, Patent Literature 2 discloses a polymer material containing a polymer having a repeating unit containing in the main chain a sulfur atom and a benzene ring in which one hydrogen atom is replaced with a methyl group, wherein the polymer material has excellent moldability in the form of a solution and can form an optical component having a high refractive index.

CITATION LIST

Patent Literature

Patent Literature 1: JP 2015-168790 A
Patent Literature 2: JP 2017-52834 A

SUMMARY OF INVENTION

Technical Problem

However, the above-described polymer materials still do not have sufficiently high refractive indices and have room for improvement. In recent years, polymer materials have been required that have high refractive indices, and that can impart excellent physical properties which are required for various applications such as optical applications, such as heat resistance, mechanical strength, and adhesion to substrates, and that can be used in a wider range of applications.

In response to the above issues, the present invention aims to provide a polymer material that has a high refractive index and can be suitably used for applications such as optical applications.

Solution to Problem

As a result of various studies on high refractive index materials, the present inventors have found that a sulfur-containing polymer having a specific functional group and a specific structure can be a polymer material that has a high refractive index and is suitable for applications such as optical applications. The present inventors also have found that a sulfur-containing polymer composition including such a sulfur-containing polymer and an inorganic substance in combination can be a high refractive index material that has excellent transparency and is more suitable as an optical material or the like. Thereby, the present invention was completed.

That is, the present invention relates to a sulfur-containing polymer containing:

at least one structural unit selected from the group consisting of a structural unit (A) represented by the following formula (1), a structural unit (B) represented by the following formula (2), and a structural unit (C) represented by the following formula (3); and a reactive functional group,

[Chem. 1]

(1)

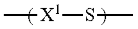

[Chem. 2]

(2)

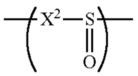

[Chem. 3]

(3)

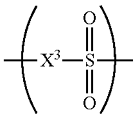

wherein $X^1$, $X^2$, and $X^3$ are the same as or different from each other and are each an optionally substituted divalent aromatic hydrocarbon group.

Preferably, the sulfur-containing polymer contains, as a repeating unit, at least one structural unit selected from the group consisting of the structural unit (A), the structural unit (B), and the structural unit (C).

Preferably, the sulfur-containing polymer contains the reactive functional group in at least one of a main chain end or a side chain.

Preferably, in the sulfur-containing polymer, the reactive functional group is at least one selected from the group consisting of a carboxyl group, a phosphoric acid group, a phosphonic acid group, a hydroxy group, a curable functional group, and groups containing these functional groups.

Preferably, in the sulfur-containing polymer, the substituent is a reactive functional group, a halogen atom, an optionally substituted alkyl group, an optionally substituted alkoxy group, an optionally substituted aryl group, an optionally substituted aralkyl group, or an optionally substituted sulfur-containing substituent.

Preferably, the sulfur-containing polymer has an element content ratio of an oxygen atom O attached to a sulfur atom S in a main chain to the sulfur atom S in the main chain (O/S) of 0.1 to 1.5

Preferably, the sulfur-containing polymer is for optical applications.

The present invention also relates to a sulfur-containing polymer composition containing:

the sulfur-containing polymer; and at least one selected from the group consisting of an inorganic substance, a cross-linking agent, and an organic resin.

The present invention also relates to a cured product of the sulfur-containing polymer.

The present invention also relates to a cured product of the sulfur-containing polymer composition.

The present invention also relates to a method for producing the sulfur-containing polymer, the method including reacting a sulfur-containing aromatic polymer terminated with at least one of a disulfide bond or a thiol group with a compound having a polymerizable double bond and a reactive functional group.

Advantageous Effects of Invention

The present invention can provide a sulfur-containing polymer and a sulfur-containing polymer composition each having a high refractive index. The sulfur-containing polymer and the sulfur-containing polymer composition of the present invention are suitable for materials for optical applications such as imaging lens materials.

DESCRIPTION OF EMBODIMENTS

Figure 1:
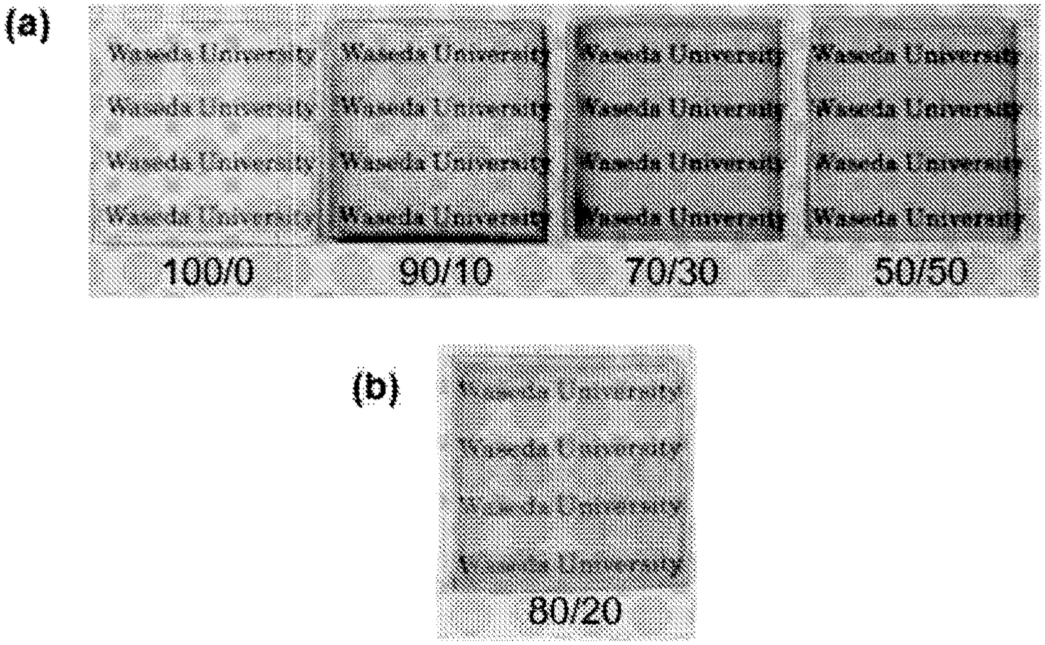
FIG. 1 shows photographs of a hybrid film obtained in Example 1.

The present invention is described in detail below.

Any combination of two or more of the following preferred embodiments of the present invention is also a preferred embodiment of the present invention.

1. Sulfur-Containing Polymer

The sulfur-containing polymer of the present invention contains at least one structural unit selected from the group consisting of a structural unit (A) represented by the following formula (1), a structural unit (B) represented by the following formula (2), and a structural unit (C) represented by the following formula (3); and a reactive functional group,

[Chem. 4]

$$-\!\!\left(X^1-S\right)\!\!- \qquad (1)$$

[Chem. 5]

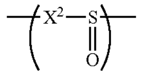

(2)

[Chem. 6]

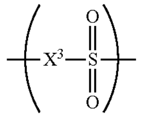

(3)

wherein $X^1$, $X^2$, and $X^3$ are the same as or different from each other and are each an optionally substituted divalent aromatic hydrocarbon group.

The sulfur-containing polymer of the present invention having the above structure has a high refractive index. The reason why the sulfur-containing polymer of the present invention has a high refractive index is presumed to be that it contains a structural unit in which the S atom, which has a high atomic refraction, is directly bonded to the aromatic hydrocarbon group.

The sulfur-containing polymer of the present invention contains a reactive functional group.

The reactive functional group may be appropriately selected according to the purpose and application of the sulfur-containing polymer of the present invention. Examples the reactive functional group include acidic functional groups such as a carboxyl group (—COOH), a phosphoric acid group (—$OPO(OH)_3$), a hydroxy group (—OH), a sulfo group (—$SO_3H$), a sulfate group (—$OSO_3H$), a phosphonic acid group (—$PO(OH)_3$), a phosphinic acid group (—PO(OH)—), and a thiol group (mercapto group) (—SH); basic functional groups such as amino, ammonium, imino, amide, imide, maleimide, and cyano groups; curable functional groups such as reactive unsaturated bond-containing groups (e.g., reactive double bond-containing groups including, as typical examples, a vinyl group, a (meth) acryloyl group, an allyl group, and a methallyl group) and reactive ionic bond-containing groups (e.g., reactive cyclic ether group-containing groups and reactive cyclic thioether-containing groups, including, as typical examples, an epoxy group, an oxetane group, episulfide (thiirane)); a nitro group; a nitroso group; and groups containing these functional groups.

Examples of the groups containing these functional groups include groups having hydrocarbon chains or bond groups and any of the acidic functional groups, the basic functional groups, the curable functional groups, described above, a nitro group, and a nitroso group.

In other words, in the present invention, examples of the reactive functional group include not only acidic functional groups, basic functional groups, curable functional groups, a nitro group, and a nitroso group, but also groups containing bond chains and any of these functional groups.

Examples of the bond chains include divalent hydrocarbon groups such as an alkylene group and an arylene group, bond groups such as ether, ester, carbonyl, and amide groups, and combinations thereof.

In particular, in order to improve the dispersibility of inorganic substances, for example, the reactive functional group is preferably an acidic functional group, a basic functional group, or a group containing any of these functional groups, more preferably a carboxyl group, a phosphoric acid group, a phosphonic acid group, a hydroxy group, or a group containing any of these functional groups.

From the viewpoint of a low thermal expansion coefficient, a carboxyl group, a phosphoric acid group, a phosphonic acid group, a hydroxy group, or a group containing any of these functional groups is preferred, and a hydroxy group or a group containing a hydroxy group is more preferred.

In order to improve the adhesion to substrates, a carboxyl group, a phosphoric acid group, a phosphonic acid group, or a group containing any of these functional groups is preferred, and a phosphoric acid group, a phosphonic acid group, or a functional group containing any of these groups is more preferred.

In order to improve the heat resistance, mechanical strength, and solvent resistance, a carboxyl group, a hydroxy group, an amino group, a maleimide group, a curable functional group, or a group containing any of these functional groups is preferred, and a carboxyl group, a hydroxy group, an amino group, a maleimide group, a vinyl group, a (meth)acryloyl group, an allyl group, a methallyl group, an epoxy group, an oxetane group, or a group containing any of these functional groups is more preferred.

In particular, in order to achieve excellent physical properties and higher refractive index, the reactive functional group is preferably a carboxyl group, a phosphoric acid group, a phosphonic acid group, a hydroxy group, a curable functional group, or a group containing any of these functional groups; more preferably a carboxyl group, a phosphoric acid group, a hydroxy group, a vinyl group, an epoxy group, or a group containing any of these functional groups; still more preferably a phosphoric acid group, a hydroxy group, a vinyl group, or a group containing any of these functional groups.

In order to achieve high refractive index and to improve the adhesion to substrates and from the viewpoint of a low thermal expansion coefficient, the reactive functional group is more preferably a carboxyl group, a phosphoric acid group, or a group containing any of these functional groups.

In order to achieve higher refractive index, the reactive functional group of the sulfur-containing polymer is preferably a substituent involved in hydrogen bonding among the reactive functional groups described above. Hydrogen bonding increases the density of the polymer and can increase the refractive index.

Examples of the substituent involved in hydrogen bonding include hydroxy, carboxylic acid, amino, amide, imide, cyano, nitro, nitroso, and sulfonic acid groups.

The amount of the substituent(s) involved in hydrogen bonding per repeating unit (monomer structural unit) in the sulfur-containing polymer is preferably 10 mol % or more, more preferably 20 mol % or more, still more preferably 50 mol % or more, further preferably 70 mol % or more, particularly preferably 90 mol % or more.

One repeating unit may contain two or more substituents involved in hydrogen bonding. The average amount of the substituent(s) is preferably 0.1 mol or more, more preferably 0.5 mol or more, still more preferably 1 mol or more, further preferably 1.5 mol or more, even further preferably 2 mol or more, particularly preferably 3 mol or more. From the viewpoint of solubility in solvents and heat resistance, the average amount of the substituent(s) involved in hydrogen bonding is preferably less than 4 mol, more preferably less than 3.5 mol.

The sulfur-containing polymer may contain one or more types of the reactive functional groups described above, with the number of each type of the reactive functional groups being one or more.

Preferably, the sulfur-containing polymer contains the reactive functional group in at least one of a main chain end or a side chain. The sulfur-containing polymer containing the reactive functional group in at least one of a main chain end or a side chain can have a high refractive index and excellent physical properties owing to the reactive functional group.

The case where the reactive functional group is present in a side chain includes not only the case where the reactive functional group is present in a side chain of the sulfur-containing polymer, but also the case where the substituents in the structural units (A) to (C) represented by the formulas (1) to (3) are any of the reactive functional groups described above.

The sulfur-containing polymer contains at least one structural unit selected from the group consisting of a structural unit (A) represented by the following formula (1), a structural unit (B) represented by the following formula (2), and a structural unit (C) represented by the following formula (3).

Preferably, the sulfur-containing polymer contains, as a repeating unit, at least one structural unit selected from the group consisting of the structural unit (A), the structural unit (B), and the structural unit (C).

The sulfur-containing polymer preferably contains two or more of the structural units (A), (B), and (C). These structural units are preferably contained as repeating units.

In the formulas (1), (2), and (3), $X^1$, $X^2$, and $X^3$ are the same as or different from each other and are each an optionally substituted divalent aromatic hydrocarbon group. Examples of the divalent aromatic hydrocarbon group include phenylene, naphthylene, anthrylene, triphenylene, biphenylene, and phenanthrylene groups. In particular, in order to reduce light dispersion caused by the sulfur-containing polymer, the divalent aromatic hydrocarbon group is preferably a phenylene group, a naphthylene group, an anthrylene group, a biphenylene group, or a triphenylene group, more preferably a phenylene group.

Examples of a substituent which may be optionally contained in the divalent aromatic hydrocarbon group (hereinafter also referred to as "substituent A") include a reactive functional group, a halogen atom, an alkyl group, an alkoxy group, an aryl group, an aralkyl group, and a sulfur-containing substituent.

Examples of the reactive functional group for the substituent A include the same groups as the reactive functional groups described above.

Examples of the halogen atom include fluorine, chlorine, bromine, and iodine atoms, with a bromine atom being preferred.

Examples of the alkyl group include methyl, ethyl, n-propyl, isopropyl, n-butyl, s-butyl, t-butyl, and hexyl groups. Of these, a C1-C18 alkyl group is preferred, a C1-C6 alkyl group is more preferred, and a methyl group is still more preferred.

Examples of the alkoxy group include methoxy, ethoxy, propoxy, isopropoxy, s-butoxy, t-butoxy, pentyloxy, phenoxy, cyclohexyloxy, and benzyloxy groups. Of these, a C1-C18 alkoxy group is preferred, a C1-C6 alkoxy group is more preferred, and a methoxy group is still more preferred.

Examples of the aryl group include phenyl, naphthyl, and biphenyl groups. Of these, a phenyl group is preferred. The carbon number of the aryl group is preferably 6 to 30, more preferably 6 to 18, still more preferably 6 to 12.

Examples of the aralkyl group include benzyl, phenethyl, phenylpropyl, phenylpentyl, phenylhexyl, and phenyloctyl groups. The carbon number of the aralkyl group is preferably 7 to 14, more preferably 7 to 9.

Examples of the sulfur-containing substituent include a thioalkyl group and a thioaryl group. Of these, a thioalkyl group is preferred. The carbon number of the sulfur-containing substituent is preferably 1 to 8, more preferably 1 to 6, still more preferably 1 to 4.

The alkyl group, alkoxy group, aryl group, aralkyl group, and sulfur-containing substituent may each optionally contain a substituent (hereinafter also referred to as "substituent B").

Examples of the substituent B include the above-described groups such as halogen atom, other than the reactive functional groups described above.

In particular, in order to achieve higher refractive index, the substituent (substituent A) in the divalent aromatic hydrocarbon group may be any of the reactive functional groups described above, a halogen atom, an alkyl group optionally containing a substituent (substituent B), an alkoxy group optionally containing a substituent (substituent B), an aryl group optionally containing a substituent (substituent B), an aralkyl group optionally containing a substituent (substituent B), or a sulfur-containing substituent optionally containing a substituent (substituent B); more preferably any of the reactive functional groups described above, an alkyl group optionally containing a substituent (substituent B), or a sulfur-containing substituent optionally containing a substituent (substituent B); still more preferably any of the reactive functional groups described above, a methyl group, or a thioalkyl group; particularly preferably any of the reactive functional groups described above or a methyl group.

The divalent aromatic hydrocarbon group may contain one or two or more types of these substituents. When the divalent aromatic hydrocarbon group contains one type of substituent, the number of the substituent may be one or more. When the divalent aromatic hydrocarbon group contains two or more types of substituents, the number of each substituent may be one or more.

When the divalent aromatic hydrocarbon group is a phenylene group, in order to achieve higher refractive index, the substituents in the phenylene group are preferably selected from hydroxy, carboxyl, amino, amide, imide, cyano, nitro, nitroso, and sulfo groups.

In order to achieve higher refractive index, the positions of the substituents in the phenylene group are preferably a combination of the 2-position and the 6-position, a combination of the 2-position and the 3-position, a combination of the 2-position and the 4-position, or a combination of the 2-position and the 5-position, with a combination of the 2-position and the 6-position being more preferred.

In particular, the phenylene group particularly preferably contains hydroxy groups at the 2-position and the 6-position. Here, the 1-position in each of the structural units refers to the position of carbon bonded to the sulfur atom in the phenylene group.

In order to achieve high refractive index and high transparency, the sulfur-containing polymer preferably further contains a substituent capable of imparting an amorphous property to the sulfur-containing polymer, other than any of the reactive functional groups described above, more preferably an alkyl group such as a methyl group, an ethyl group, or a propyl group, an alkoxy group such as a methoxy group or an ethoxy group, an aryl group, a sulfur-containing substituent, or a halogen-containing group, still more preferably a methyl group or a methoxy group. The substituent (s) in the sulfur-containing polymer may be the substituent A or the substituent B.

The divalent aromatic hydrocarbon group may contain any number of substituents A. In order to further increase the higher refractive index of the sulfur-containing polymer, the number of substituents A is preferably smaller. Specifically, the number of substituents A is preferably 1 to 6, more preferably 1 to 3, still more preferably 1.

The sulfur-containing polymer preferably contains the structural unit (A), the structural unit (B), or the structural unit (C), as a repeating unit. The structural units may be linked to each other at the o-position, m-position, or p-position of $X^1$, $X^2$, and $X^3$ to which —S—, —SO—, and $—SO_2—$ are bonded, respectively, and two or more types of bonding sites may be present. From the viewpoint of high refractive index, the p-position is preferred, and from the viewpoint of solubility, the o-position and the m-position are preferred.

The sulfur-containing polymer may have structural units in which two or more structural units are linked at different positions.

In the sulfur-containing polymer, the amount of structural units linked at the p-position based on 100 mol % of all structural units of the polymer is preferably 10 mol % or more, more preferably 30 mol % or more, preferably less than 99 mol %, more preferably less than 90 mol %, still more preferably less than 80 mol %.

Preferably, the structural unit (A) represented by the formula (1) is a structural unit (A-1) represented by the following formula (1-1):

[Chem. 7]

(1-1)

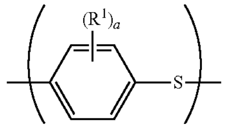

wherein $R^1$s are the same as or different from each other and are each a halogen atom, a reactive functional group, or an optionally substituted alkyl group, an optionally substituted alkoxy group, an optionally substituted aryl group, an optionally substituted aralkyl group, or an optionally substituted sulfur-containing substituent; and a represents the number of R's and is an integer of 0 to 4.

The structural unit (B) represented by the formula (2) is preferably a structural unit (B-1) represented by the following formula (2-1).

[Chem. 8]

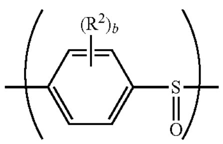

(2-1)

wherein $R^2$s are the same as or different from each other and are each a halogen atom, a reactive functional group, or an optionally substituted alkyl group, an optionally substituted alkoxy group, an optionally substituted aryl group, an optionally substituted aralkyl group, or an optionally substituted sulfur-containing substituent; and b represents the number of $R^2$s and is an integer of 0 to 4.

The structural unit (C) represented by the formula (3) is preferably a structural unit (C-1) represented by the following formula (3-1).

[Chem. 9]

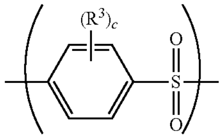

(3-1)

wherein $R^3$s are the same as or different from each other and are each a halogen atom, a reactive functional group, or an optionally substituted alkyl group, an optionally substituted alkoxy group, an optionally substituted aryl group, an optionally substituted aralkyl group, or an optionally substituted sulfur-containing substituent; and c represents the number of $R^3$s and is an integer of 0 to 4.

Preferred examples of the halogen atom, reactive functional group, alkyl group, alkoxy group, aryl group, aralkyl group, and sulfur-containing substituent for $R^1$, $R^2$, or $R^3$ include the groups described above for the respective groups.

Preferred examples of the substituent which may be optionally contained in these groups include the groups described above for the substituent B.

The letters a, b, and c represent the numbers of substituents $R^1$, $R^2$, and $R^3$, and are each an integer of 0 to 4, preferably an integer of 0 to 2, more preferably an integer of 1 or 2.

The sulfur-containing polymer may be an alternating copolymer, block copolymer, or random copolymer including the structural units (A), (B), and/or (C).

The number of types of each of the structural units (A), (B), and (C) in the sulfur-containing polymer may be one or more.

The sulfur-containing polymer may have a structure containing one of the structural unit (A), (B), or (C), a structure containing two of these structural units, or a structure containing the three structural units. These structures and the contents of the structural units can be appropriately selected according to the purpose and application of the sulfur-containing polymer.

For example, in order to achieve higher refractive index, the sulfur-containing polymer preferably contains the structural unit (A), more preferably contains the structural unit (A) as a main component.

In order to achieve both solubility and high refractive index, the sulfur-containing polymer preferably contains the structural unit (B), more preferably contains the structural unit (B) as a main component.

In order to achieve both transparency and high refractive index, the sulfur-containing polymer preferably contains the structural unit (C), more preferably contains the structural unit (C) as a main component.

Thus, from the viewpoint of high refractive index, the content of the structural unit (A) in the sulfur-containing polymer is preferably 1 to 100 mol %, more preferably 10 to 100 mol %, still more preferably 50 to 100 mol %, based on 100 mol % of all structural units of the polymer.

In this case, the total content of the structural unit (B) and the structural unit (C) is preferably 0 to 99 mol %, more preferably 0 to 90 mol %, still more preferably 0 to 50 mol %, based on 100 mol % of all structural units of the polymer.

From the viewpoint of high polarity due to solubility, the content of the structural unit (B) in the sulfur-containing polymer is preferably 1 to 100 mol %, more preferably 10 to 100 mol %, still more preferably 50 to 100 mol %, based on 100 mol % of all structural units of the polymer.

In this case, the total content of the structural unit (A) and the structural unit (C) is preferably 0 to 99 mol %, more preferably 0 to 90 mol %, still more preferably 0 to 50 mol %, based on 100 mol % of all structural units of the polymer.

From the viewpoint of high transparency, the content of the structural unit (C) in the sulfur-containing polymer is preferably 1 to 100 mol %, more preferably 10 to 100 mol %, still more preferably 50 to 100 mol %, based on 100 mol % of all structural units of the polymer.

In this case, the total content of the structural unit (A) and the structural unit (B) is preferably 0 to 99 mol %, more preferably 0 to 90 mol %, still more preferably 0 to 50 mol %, based on 100 mol % of all structural units.

In the sulfur-containing polymer, the total content of the structural units (A), (B), and (C) is preferably 50 mol % or more, more preferably 80 mol % or more, still more preferably 90 mol % or more, further preferably 95 mol % or more, particularly preferably 100 mol %, based on 100 mol % of all structural units of the polymer.

The sulfur-containing polymer may contain a structural unit (D) other than the structural unit (A), the structural unit (B), and the structural unit (C). The sulfur-containing polymer may further contain the structural unit (D) as a repeating unit.

An example of the structural unit (D) is a structural unit having at least any of the reactive functional groups described above.

Another example of the structural unit (D) is a structural unit derived from a monomer having a polymerizable double bond and any of the reactive functional groups described above.

Examples of the polymerizable double bond include a vinyl group, a (meth)acryloyl group, an allyl group, and a methallyl group. Of these, a (meth)acryloyl group is preferred.

Examples of the monomer having a polymerizable double bond and any of the reactive functional groups described above include carboxyl group-containing (meth)acrylates such as 2-carboxyethyl (meth)acrylate, 2-carboxypropyl (meth)acrylate, 3-carboxypropyl (meth)acrylate, and 4-carboxybutyl (meth)acrylate; phosphoric acid group-containing (meth)acrylates such as 2-(meth)acryloyloxyethyl acid phosphate; epoxy group-containing (meth)acrylates such as glycidyl (meth)acrylate and 3,4-epoxycyclohexylmethyl (meth)acrylate; and vinyl ether group-containing (meth) acrylates such as 2-(2-vinyloxyethoxy)ethyl (meth)acrylate.

The content of the structural unit (D) is preferably 0 to 80 mol %, more preferably 0 to 50 mol %, still more preferably 0 to 20 mol %, further preferably 0 to 10 mol %, particularly preferably 0 to 5 mol %, based on 100 mol % of all structural units of the polymer.

Preferably, the sulfur-containing polymer has an element content ratio of an oxygen atom O attached to a sulfur atom S in the main chain to the sulfur atom S in the main chain (0/S) of 0.1 to 1.5. An element content ratio within the above range can achieve higher transparency and higher refractive index.

Specifically, for example, the "sulfur atom S in the main chain" refers to the sulfur atom S of —S— in the main chain in the structural unit (A) represented by the formula (1). The "sulfur atom S in the main chain" refers to the sulfur atom S of —SO— in the main chain in the structural unit (B) represented by the formula (2), and refers to the sulfur atom S of —$SO_2$— in the main chain in the structural unit (C) represented by the formula (3).

Also, specifically, for example, the "oxygen atom attached to a sulfur atom S in the main chain" refers to the oxygen atom O of —SO— in the main chain in the structural unit (B) represented by the formula (2), and refers to the oxygen atoms 0 of —$SO_2$— in the main chain in the structural unit (C) represented by the formula (3).

In order to achieve higher transparency, the element content ratio (O/S) is more preferably 0.3 or higher, still more preferably 0.7 or higher. In order to achieve higher refractive index, the O/S is more preferably 1.3 or lower, still more preferably 1.1 or lower.

The element content ratio can be determined by measuring and evaluating the peak intensities of the 2p orbital (S2p) of a sulfur atom using an X-ray photoelectron spectrometer (XPS). Specifically, the element content ratio can be determined by the method described in the EXAMPLES.

The sulfur-containing polymer preferably has a glass transition temperature (Tg) of 80° C. to 250° C. A sulfur-containing polymer having a glass transition temperature within the above range can be easily molded and processed. In order to achieve higher heat resistance, the glass transition temperature is more preferably 90° C. or higher, still more preferably 100° C. or higher. In order to achieve easy molding and processing, the glass transition temperature is more preferably 200° C. or lower.

The glass transition temperature can be determined as follows: using a differential scanning calorimeter (DSC), a DSC curve is created under the condition that the temperature is increased from room temperature to 250° C. at a temperature-increasing rate of 10° C./min in a nitrogen atmosphere, and evaluation is performed based on the intersection of the baseline and the tangent line at the inflection point of the curve.

The sulfur-containing polymer preferably has a binding energy of sulfur atom of 163 eV to 167 eV. A sulfur-containing polymer having the a binding energy of sulfur atom within the above range can achieve higher refractive index and higher transparency.

The binding energy of sulfur atom can be determined by evaluating the position of the peak top of the 2p3/2 orbital of a sulfur atom determined by X-ray photoelectron spectroscopy (XPS).

The sulfur-containing polymer preferably has a weight average molecular weight (Mw) of 500 to 10000000. A sulfur-containing polymer having a weight average molecular weight within the above range can be suitably used as an optical material. In order to improve the mechanical properties, the weight average molecular weight is more preferably 1000 or greater, still more preferably 3000 or greater, further preferably 10000 or greater. In order to reduce the melt viscosity, Mw is more preferably 1000000 or smaller, still more preferably 100000 or smaller.

The sulfur-containing polymer preferably has a degree of dispersibility (weight average molecular weight/number average molecular weight) of 1 to 10. A sulfur-containing polymer having a degree of dispersibility within the above range can be easily molded. In order to further improve the moldability, the degree of dispersibility is more preferably 5 or lower, still more preferably 3 or lower.

The weight average molecular weight and the number average molecular weight can be measured by a gel permeation chromatography (GPC) analysis. Specifically, they can be determined by the methods described in the EXAMPLES below. The degree of dispersibility can be determined by dividing the weight average molecular weight by the number average molecular weight.

The sulfur-containing polymer preferably has a refractive index of 1.69 or higher. A sulfur-containing polymer having a refractive index within the above range can be suitably used for various applications, including optical materials (components), materials of machine parts, materials of electric and electronic parts, materials of automobile parts, materials for civil engineering and construction, molding materials, materials of paints and adhesives, and the like. The refractive index is more preferably 1.7 or higher, still more preferably 1.71 or higher.

The refractive index can be determined as follows: a 50-nm thick film is prepared as a measurement sample using the sulfur-containing polymer and is subjected to measurement using the Na D line (589 nm) with a spectroscopic ellipsometer UVISEL (available from HORIBA Scientific Co., Ltd.).

The sulfur-containing polymer preferably has an Abbe number of 10 or greater. A sulfur-containing polymer having an Abbe number within the above range causes less light dispersion and can be an optical material suitable for lenses and the like. The Abbe number is more preferably 15 or greater, still more preferably 18 or greater, further preferably 20 or greater. In order to control light dispersion, the Abbe number is preferably 60 or smaller, more preferably 55 or smaller.

The Abbe number can be determined similarly to the refractive index as follows: a film is prepared using the sulfur-containing polymer and is subjected to measurement of the refractive indices at the D line (589.3 nm), the F line (486.1 nm), and the C line (656.3 nm) with the same spectroscopic ellipsometer as above, and the Abbe number is determined using the following equation:

$$\text{Abbe number}(\nu_D)=(n_D-1)/(n_F-n_C)$$

wherein $n_D$, $n_F$, and $n_C$ are the refractive indices at the Fraunhofer D line (589.3 nm), the Fraunhofer F line (486.1 nm), and the Fraunhofer C line (656.3 nm), respectively.

The sulfur-containing polymer preferably has a visible transmittance of 70% or higher. A sulfur-containing polymer having a visible transmittance within the above range can be suitably used as an optical material. The visible transmittance is more preferably 80% or higher, still more preferably 85% or higher, even more preferably 88% or higher.

The visible transmittance is a parallel transmittance and can be determined as follows: a thin film made of the sulfur-containing polymer having a certain thickness (e.g., 1 μm) is used or the thickness is normalized; the transmittance of the thin film was measured in the range of 400 nm to 700 nm with air as a reference using a spectrophotometer (e.g., UV-visible-infrared spectrophotometer V-700 series available from JASCO Corporation) without an integrating sphere; and the lowest value of the transmittance is evaluated.

The sulfur-containing polymer is preferably amorphous when used for optical material applications requiring transparency. The sulfur-containing polymer preferably has a crystallinity of lower than 80%, more preferably lower than 50%, still more preferably lower than 30%, particularly preferably lower than 10%, most preferably lower than 5%. When the sulfur-containing polymer is used for applications requiring heat resistance but not requiring transparency, the sulfur-containing polymer preferably has a crystallinity of 1% or higher, more preferably 10% or higher, still more preferably 30% or higher, particularly preferably 60% or higher.

The crystallinity can be measured by X-ray diffraction (XRD). Crystallinity can be determined as follows: the obtained XRD profile is separated into peaks, with a peak with a half-value width of less than 1 indicating a crystalline peak, and a peak with a half-value width of 1 or more indicating an amorphous peak, and the ratio of the area of the crystalline peaks to the total peak area is determined as a crystallinity.

The sulfur-containing polymer is preferably thermoplastic. When the sulfur-containing polymer is thermoplastic, the polymer has good molding processability. Specifically, the polymer can be formed into a uniform thin film and formed into a complicated shape with high precision. Thus, the polymer can be easily applied to a wide range of applications.

The sulfur-containing polymer can form a thermoplastic resin by copolymerization or addition reaction with other monomers through a reactive functional group, especially a curable functional group.

When a thermoplastic resin is formed, a compound (monomer) containing a substituent that reacts with the reactive functional group of the sulfur-containing polymer is preferably used. The monomer may be the sulfur-containing polymer.

Examples of the substituent in the monomer include ring-opening polymerizable groups such as an epoxy group, an oxetane ring, an ethylene sulfide group, and an aziridine group; radical curable groups and/or addition curable groups such as an acrylic group, a methacrylic group, an allyl group, a vinyl group, and a maleimide group; addition reactive groups such as a hydroxy group, a thiol group, and a hydrosilyl group; esterification reactive groups such as a carboxylic acid group, an oxazoline group, a hydroxy group, a thiol group, and an amino group; and a urethane forming or thiourethane forming reactive group such as an isocyanate group.

The monomer is preferably a compound having a ring-opening polymerizable group (e.g., an epoxy group, an oxetane group, an ethylene sulfide group) that is curable by cationic curing, a compound having an acrylic group and/or a methacrylic group that is curable by radical curing, or a compound having a vinyl group that is curable by an addition reaction such as hydrosilylation or an ene-thiol reaction.

For example, a sulfur-containing polymer terminated with a monofunctional double bond may be radically polymerized with a different monofunctional double bond. Thereby, a thermoplastic copolymer can be obtained. Also, an ene-thiol reaction between a sulfur-containing polymer terminated with a monofunctional thiol group and double bonds of other polymers may be carried out. Thereby, a thermoplastic polymer can be obtained.

<Method for Producing Sulfur-Containing Polymer>

The method for producing a sulfur-containing polymer of the present invention may be any method capable of producing a polymer having any of the reactive functional groups described above and at least one selected from the group consisting of the structural units (A) to (C). Examples of the method include known polymerization methods such as a method in which a monomer component containing a sulfur-containing monomer having any of the reactive functional groups described above is polymerized; and a method in which the monomer component containing a sulfur-containing monomer is polymerized to obtain a polymer, and the polymer is reacted with a compound having any of the reactive functional groups described above, thereby introducing the reactive functional group into the polymer. In order to efficiently produce the sulfur-containing polymer, preferably, the polymer is reacted with a compound having any of the reactive functional groups described above, thereby introducing the reactive functional group into the polymer.

A preferred example of the method for producing the sulfur-containing polymer of the present invention is a method including reacting a sulfur-containing aromatic polymer terminated with at least one of a disulfide bond or a thiol group with a compound having a polymerizable double bond and a reactive functional group. The present invention encompasses such a method for producing a sulfur-containing polymer.

In the reacting, for example, the sulfur-containing aromatic polymer terminated with a disulfide bond is reacted with the compound having a polymerizable double bond and a reactive functional group by breaking the disulfide bond in a terminal end of the sulfur-containing aromatic polymer using light or a radical initiating catalyst so that the compound is bonded to the polymer, thereby introducing the reactive functional group into the polymer (Method a).

Alternatively, the sulfur-containing aromatic polymer terminated with a thiol group is reacted with the compound having a polymerizable double bond and a reactive functional group so that the compound is bonded to the polymer through a thiol-ene reaction, thereby introducing the reactive functional group into the polymer (Method b).

Alternatively, the sulfur-containing aromatic polymer terminated with a disulfide bond is reacted with a reductant such as sodium borohydride, triphenylphosphine, triiron tetroxide, or diiron trioxide to form a thiol group (—SH) in a terminal end, and is then reacted with the compound having a polymerizable double bond and a reactive functional group so that the compound is bonded to the polymer through a thiol-ene reaction, thereby introducing the reactive functional group into the polymer (Method c).

Alternatively, another example of the method for producing a sulfur-containing polymer is a method in which hydroxy groups are formed by a nucleophilic reaction of water with a sulfur-containing aromatic polymer having a substituent such as a halogen atom (e.g., a halogenated alkyl substituent) and are introduced into the polymer as reactive functional groups (Method d).

Other examples of the method for producing a sulfur-containing polymer include a method (Method e) in which a polymer is obtained from a sulfur-containing monomer having a substituent that has a reactive functional group such as a carboxyl group using the method described later, and a method (Method f) in which the sulfur-containing aromatic polymer having a carboxyl group obtained in (Method e) is treated with a reductant such as dimethyl sulfide borane, a borane-tetrahydrofuran complex, or N,N-dimethylaniline borane to generate hydroxy groups, which are introduced as reactive functional groups.

(Method a), (Method b), and (Method c) are preferred to produce a sulfur-containing polymer having a reactive functional group in a main chain end.

(Method d), (Method e), and (Method f) are preferred to produce a sulfur-containing polymer having a reactive functional group in a side chain.

Examples of the polymerizable double bond include vinyl, (meth)acryloyl, allyl, and methallyl groups.

The reactive functional group is any of the reactive functional groups described above, for example.

An appropriate method is selected from (Method a) to (Method f) according to the type of reactive functional group to be introduced and the compound to be used. Also, appropriate reaction conditions and the like may be selected based on known techniques.

The following describes some preferred examples of the method for producing a sulfur-containing polymer of the present invention.

For example, (Method c) is preferred to produce a sulfur-containing polymer terminated with a carboxyl group, a phosphoric acid group, a phosphonic acid group, or a curable functional group.

Specifically, a sulfur-containing aromatic polymer terminated with a disulfide bond is first treated with a reductant such as sodium borohydride to break the disulfide bond (—S—S—), thereby forming a thiol group in a terminal end.

Examples of the reductant to be used include sodium borohydride, lithium triethylborohydride, triphenylphosphine, and Rongalite (sodium formaldehyde sulfoxylate).

The amount of the reductant to be used can be appropriately selected according to the amount of side chains or terminal groups of the sulfur-containing aromatic polymer. For example, the amount is preferably 1 to 1000 parts by mass, more preferably 5 to 300 parts by mass, still more preferably 10 to 100 parts by mass, relative to 100 parts by mass of the sulfur-containing aromatic polymer.

The reaction temperature for forming a thiol group from a disulfide bond is preferably 0° C. to 200° C., more preferably 10° C. to 100° C. The reaction duration is usually 0.1 to 100 hours, preferably 0.5 to 50 hours, more preferably 1 to 24 hours, but is not limited thereto.

A solvent may be used in the reaction for forming a thiol group. Examples of the solvent to be used include alcohol solvents such as methanol, ethanol, propanol, butanol, methyl cellosolve, butyl cellosolve, and propylene glycol monomethyl ether; ketone solvents such as acetone, methyl ethyl ketone, methyl isobutyl ketone, and cyclohexanone; ester solvents such as ethyl acetate, isopropyl acetate, butyl acetate, and γ-butyrolactone; ether solvents such as diethyl ether, diisopropyl ether, 1,2-dimethoxyethane (DME), and tetrahydrofuran (THF); aromatic hydrocarbon solvents such as toluene and xylene; halogenated hydrocarbon solvents such as chlorobenzene, fluorobenzene, dichloromethane, chloroform, carbon tetrachloride, 1,2-dichloroethane, and benzotrifluoride; amide solvents such as dimethylformamide (DMF), dimethylacetamide, and N-methylpyrrolidone; dimethylsulfoxide (DMSO); and nitromethane.

Then, the terminal thiol group is reacted with a compound having a polymerizable double bond and a carboxyl group, a phosphoric acid group, a phosphonic acid group, or a curable functional group (two or more polymerizable groups).

The compound having a polymerizable double bond and a carboxyl group, a phosphoric acid group, or a phosphonic acid group is a compound having a carboxyl group, a phosphoric acid group, or a phosphonic acid group and a polymerizable double bond capable of reacting with a thiol group. Examples of the compound include a compound having a vinyl group and a carboxyl group, a compound having a (meth)acryloyl group and a phosphonic acid group, a compound having a (meth)acryloyl group and a carboxyl group, and a compound having a (meth)acryloyl group and a phosphoric acid group.

Specific examples of the compound include 4-pentenoic acid, carboxyethyl acrylate, 2-acryloyloxyethyl-succinic acid, 2-acryloyloxyethyl hexahydrophthalic acid, 2-acryloyloxyethyl phosphate, and vinyl phosphonic acid. Preferred among these are 4-pentenoic acid, carboxyethyl acrylate, 2-acryloyloxyethyl phosphate, and vinyl phosphonic acid because they can achieve high refractivity and have high reactivity.

The amount of the compound to be used can be appropriately selected according to the amount of the reactive functional group to be introduced. The amount is preferably 0.1 to 1000 parts by mass, more preferably 1 to 20 parts by mass, still more preferably 1 to 10 parts by mass, relative to 100 parts by mass of the sulfur-containing aromatic polymer, for example.

Preferably, the reaction with the compound having a polymerizable double bond and a carboxyl group, a phosphoric acid group, or a phosphonic acid group is performed by light irradiation. The light irradiation can be performed by a known method using a known light source. The reaction may be performed using a known polymerization initiator, catalyst, or the like, and the types and amounts thereof may be appropriately selected.

For example, (Method a) is preferred to directly introduce a reactive functional with the thiolation step being shortened.

In (Method a), for example, the sulfur-containing aromatic polymer is directly reacted with the compound having a polymerizable double bond and a carboxyl group, a phosphoric acid group, or a phosphonic acid group.

In (Method a), the amount of the compound having a polymerizable double bond and a carboxyl group, a phosphoric acid group, or a phosphonic acid group to be used can be appropriately selected according to the amount of the reactive functional group to be introduced. The amount is preferably 0.1 to 5000 parts by mass, more preferably 1 to 100 parts by mass, still more preferably 1 to 20 parts by mass, relative to 100 parts by mass of the sulfur-containing aromatic polymer, for example.

Preferably, in (Method a), the reaction with the compound having a polymerizable double bond and a carboxyl group is performed by light irradiation. The light irradiation can be performed by a known method using a known light source. The reaction may be performed using a known initiator, catalyst, or the like, and the types and amounts thereof may be appropriately selected.

For example, (Method b) is preferably used in the case of using a sulfur-containing polymer having a thiol group. The reaction between the sulfur-containing polymer having a thiol group and the compound having a polymerizable double bond and a reactive functional group is preferably performed under the same conditions as in (Method c).

For example, (Method d) or (Method e) is preferred to produce a sulfur-containing polymer having a reactive functional group in a side chain.

In (Method d), the sulfur-containing aromatic polymer having a substituent such as a halogen atom can be obtained, for example, as follows: in the method for producing a sulfur-containing aromatic polymer described later, a sulfur-containing polymer having an alkyl substituent is added to N-bromosuccinimide and 2,2'-azobis(isobutyronitrile) and they are reacted.

This reaction may be performed at any temperature. The temperature is preferably 10° C. to 200° C., more preferably 50° C. to 150° C.

Addition of water to the resulting sulfur-containing aromatic polymer having a halogenated alkyl group can provide a sulfur-containing polymer having a hydroxy group in a side chain.

When a sulfur-containing polymer having a carboxyl group in a side chain is produced by (Method e), it can be obtained using benzenethiol having a carboxyl group, specifically, 2-mercaptobenzoic acid, 3-mercaptobenzoic acid, or the like as a sulfur-containing monomer in the method for producing a sulfur-containing aromatic polymer described later.

An example of a method for producing a sulfur-containing polymer having a curable functional group such as a vinyl group in a side chain is a method in which a sulfur-containing polymer having an alkyl substituent is added to N-bromosuccinimide and 2,2'-azobis(isobutyronitrile) and they are reacted to obtain a sulfur-containing aromatic polymer having a halogen atom (bromine atom) substituent, as described above, and then, the polymer is reacted with triphenylphosphine, an aqueous formaldehyde solution, and potassium t-butoxide.

An example of a method for producing a sulfur-containing polymer having a hydroxy group in a side chain is a method in which a sulfur-containing aromatic polymer having an alkoxy group substituent is obtained using a monomer having an alkoxy group substituent such as a methoxy group in the method for producing a sulfur-containing aromatic polymer described later, the polymer is reacted with boron tribromide, and water is added to the reaction product.

In the production method of the present invention, the sulfur-containing aromatic polymer may be produced by polymerization, or may be a commercial product.

The sulfur-containing aromatic polymer may be produced by polymerizing a monomer component containing a sulfur-containing monomer, for example.

Preferred examples of the sulfur-containing monomer include a disulfide compound and a thiol compound. Specifically, more preferred examples of the sulfur-containing monomer include a diaryl disulfide compound represented by the following formula (4) and a thioaryl compound represented by the following formula (5).

[Chem. 10]

$$A^1\text{-}S\text{—}S\text{-}A^2 \quad (4)$$

$$A^1\text{-}SH \quad (5)$$

In the formulas (4) and (5), $A^1$ and $A^2$ are the same as or different from each other and are each an optionally substituted monovalent aromatic hydrocarbon group.

An example of the monovalent aromatic hydrocarbon group for $A^1$ or $A^2$ is a monovalent group converted from the divalent aromatic hydrocarbon group for $X^1$ in the formula (1). Specific examples thereof include phenyl, naphthyl, anthryl, triphenyl, biphenyl, and phenanthryl groups. Of these, phenyl, naphthyl, anthryl, biphenyl, and triphenyl groups are preferred, with a phenyl group being more preferred.

Examples of the substituent in the monovalent aromatic hydrocarbon group for $A^1$ or $A^2$ include a reactive functional group, a halogen atom, an alkyl group, an alkoxy group, an aryl group, an aralkyl group, and a sulfur-containing substituent. Examples of the reactive functional group, halogen atom, alkyl group, alkoxy group, aryl group, aralkyl group, and sulfur-containing substituent include the above-listed corresponding groups.

The diaryl disulfide compound is preferably a compound represented by the following formula (4-1).

The thioaryl compound is preferably a compound represented by the following formula (5-1).

[Chem. 11]

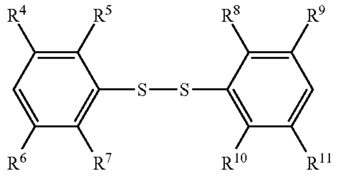

(4-1)

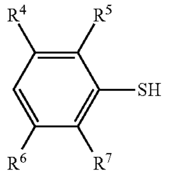

(5-1)

In the formulas (4-1) and (5-1), $R^4$, $R^5$, $R^6$, $R^7$, $R^8$, $R^9$, $R^{10}$, and $R^{11}$ are the same as or different from each other and are each a hydrogen atom, a halogen atom, a reactive functional group, or an optionally substituted alkyl group, an optionally substituted alkoxy group, an optionally substituted aryl group, an optionally substituted aralkyl group, or an optionally substituted sulfur-containing substituent.

Examples of the halogen atom, reactive functional group, optionally substituted alkyl group, optionally substituted alkoxy group, optionally substituted aryl group, optionally substituted aralkyl group, and optionally substituted sulfur-containing substituent include the above-listed corresponding groups for $R^1$ in the formula (1-1).

Examples of the substituents optionally contained in these groups include those listed for the substituent B above. In particular, a halogen atom is preferred.

The disulfide compound can also be prepared by oxidation of a thiol compound. In the polymerization, a thiol compound can be used as a precursor of the disulfide compound. The disulfide compound can be obtained by oxidatively coupling two thiol compound molecules.

The oxidation of a thiol compound to obtain the disulfide compound may be performed by any method and can be performed by a known method such as oxidation using hydrogen peroxide, iodine, or the like.

The sulfur-containing monomer may include one or two or more of the compounds described above.

The polymerization is preferably oxidative polymerization. The oxidative polymerization may be performed by any method and can be performed by a known method such as a method of using a quinone compound or a method of using a metal compound such as a vanadium compound. In particular, a quinone oxidant is preferably used in the oxidative polymerization because it can improve the transparency. A metal compound is preferably used because it can be used in a smaller amount for the monomer component, leading to a reduction in amount of waste.

Examples of the quinone oxidant include 2,3-dichloro-5,6-dicyano-p-benzoquinone (DDQ), 2,3,5,6-tetrachloro-p-benzoquinone (chloranil), 2,3,5,6-tetrabromobenzoquinone (bromanil), 2,3,5,6-tetrafluoro-p-benzoquinone, anthraquinone, 1,4-naphthoquinone, 2,3-dichloro-1,4-naphthoquinone, 2,3-dibromo-1,4-naphthoquinone, 2,3-dicyano-1,4-naphthoquinone, 3,4,5,6-tetrachloro-o-benzoquinone (o-chloranil), 3,4,5,6-tetrabromo-o-benzoquinone (o-bromanil), and 3,4,5,6-tetrafluorobenzoquinone. Of these, DDQ is preferred because it has a high oxidation power and is easily available. The quinone oxidant may include one of these alone or two or more of these.

The quinone oxidant is preferably added in an amount of 0.1 to 3 mol, more preferably 0.8 to 1.5 mol, still more preferably 0.9 to 1.1 mol per mole of the sulfur-containing monomer used.

When the quinone oxidant is used, an acid may further be added. Although when the quinone oxidant acts, the quinone compound is converted into a hydroquinone dianion, the acid added can stabilize such a dianion, and the oxidative power can be maintained.

Non-limiting examples of the acid include sulfuric acid, acetic acid, methanesulfonic acid, benzenesulfonic acid, toluenesulfonic acid, trifluoromethanesulfonic acid, 1,1,2,2-tetrafluoroethanesulfonic acid, trifluoroacetic acid, perfluoropropionic acid, and perfluorobutyric acid. Of these, in order to increase the acidity, trifluoroacetic acid is preferred. The acid may include one of these alone or two or more of these.

The amount of the acid added is preferably 10 to 1000 mol, more preferably 50 to 500 mol, still more preferably 80 to 120 mol, relative to 100 mol of the whole amount of the quinone oxidant added.

The reaction temperature may be any temperature at which the polymerization can proceed. In order to allow the oxidative polymerization to easily proceed, the reaction temperature is preferably 0° C. to 200° C., more preferably 10° C. or higher, still more preferably 15° C. or higher. In order to reduce or prevent the side reaction, the reaction temperature is more preferably 180° C. or lower, still more preferably 150° C. or lower.

The reaction duration is usually 0.1 to 100 hours, preferably 1 to 80 hours, more preferably 5 to 50 hours, still more preferably 10 to 24 hours, but is not limited thereto.

In the polymerization reaction, a solvent may be used. Preferred examples of the solvent include dichloromethane, chloroform, carbon tetrachloride, 1,2-dichloroethane, tetrachloroethylene, 1,1,2,2-tetrachloroethane, nitromethane, nitrobenzene, chlorobenzene, 1,2-dichlorobenzene, 1,3-dichlorobenzene, N-methylpyrrolidone, tetrahydrofuran, and ethyl acetate.

In the polymerization reaction, the monomer component containing a sulfur-containing monomer may be sequentially added during the polymerization reaction.

Multistage polymerization may be performed in which, for example, a thiol compound is oxidatively polymerized to obtain a disulfide compound as described above, and the disulfide compound is then oxidatively polymerized.

The method for producing a sulfur-containing polymer may include oxidizing using an oxidant a polymer into which the reactive functional group has been introduced by the above step. The oxidizing allows oxidation of —S— in the main chain to —SO— or —$SO_2$—, thereby providing a sulfur-containing polymer having the structural unit (B) and/or the structural unit (C).

The oxidant is not limited and may be a known oxidant. In particular, the oxidant is preferably a peroxide or chloric acid, which can moderately oxidize the sulfide group (—S—) on the main chain to a sulfoxide (sulfinyl group) (—SO—).

Examples of the peroxide include m-chloroperbenzoic acid, hydrogen peroxide, ammonium persulfate, sodium persulfate, peracetic acid, and t-butylhydroperoxide.

The oxidant is preferably a peroxide, more preferably m-chloroperbenzoic acid or hydrogen peroxide among these because they are soluble in a solvent capable of dissolving the sulfur-containing polymer. In order not to use water, which can precipitate polymers, and in order to reduce or prevent oxidation to a sulfonyl caused by excess oxidant, the oxidant is still more preferably m-chloroperbenzoic acid.

When hydrogen peroxide is used as the peroxidant, in order to reduce or prevent precipitation of the polymer, a phase transfer catalyst such as trifluoroacetone is preferably used with a reduced amount of water.

The oxidant may include one of these alone or two or more of these in combination.

The amount of the oxidant may be any amount that allows desired oxidation reaction of the sulfur atoms to proceed, and is usually preferably 0.1 to 10 mol, more preferably 0.5 to 5 mol, still more preferably 0.8 to 1.5 mol per mole of the sulfur atoms in the sulfur-containing polymer.

The oxidation reaction may be performed at any reaction temperature at which desired oxidation reaction proceeds. In order to allow the oxidation reaction to easily proceed, the reaction temperature is preferably 0° C. to 200° C., more preferably 10° C. or higher, still more preferably 15° C. or higher. In order to reduce or prevent the side reaction, the reaction temperature is more preferably 180° C. or lower, still more preferably 150° C. or lower.

The reaction duration is usually 0.1 to 100 hours, preferably 1 to 80 hours, more preferably 5 to 50 hours, still more preferably 10 to 24 hours, but is not limited thereto.

When —S— is oxidized to —$SO_2$—, the reaction may be performed for a longer duration than the above-described reaction duration at the above-described reaction temperature. In this case, the amount of the oxidant may be any amount that allows desired oxidation reaction of the sulfur atoms to proceed. The amount of the oxidant is usually preferably 1.5 to 100 mol, more preferably 2 to 50 mol, still more preferably 2 to 10 mol per mole of the sulfur atoms in the sulfur-containing polymer.

In the oxidation reaction, a solvent may be used. Preferred examples of the solvent include the solvents used in the polymerization described above.

The polymer obtained through the oxidation is preferably washed because acid or other substances may be left therein. The polymer may be washed by any means and may be washed with water, an acid, a base, or the like, for example. The polymer may be filtered or washed with a solvent to remove unreacted substances. The solvent may be any solvent and may be the same as the reaction solvent.

The method for producing a sulfur-containing polymer may include a different step in addition to the above-described steps. Examples of the different step include aging, neutralization, dilution, drying, concentration, and purification. These steps may be performed by known methods.

2. Sulfur-Containing Polymer Composition

The sulfur-containing polymer of the present invention may be combined with a different component to form a sulfur-containing polymer composition. The different component may be any component and may be appropriately selected from known components according to the purpose and application of the sulfur-containing polymer composition.

The amount of the sulfur-containing polymer in the sulfur-containing polymer composition may be appropriately selected according to the application and purpose of the sulfur-containing polymer composition. The amount of the sulfur-containing polymer is preferably 10 to 100% by mass based on 100% by mass of total solids of the sulfur-containing polymer composition. In order to achieve higher transparency and higher refractive index, the amount is more preferably 20% by mass or more, still more preferably 50% by mass or more. In order to keep the viscosity of the sulfur-containing polymer composition low, the amount of the sulfur-containing polymer is preferably 99% by mass or less, more preferably 95% by mass or less, still more preferably 85% by mass or less, particularly preferably 80% by mass or less, most preferably 60% by mass or less.

Specific examples of the different component include inorganic substances, cross-linking agents, curing catalysts, curing agents, organic resins, pigments, dyes, antioxidants, UV absorbers, IR blocking agents, reactive diluents, light stabilizers, plasticizers, non-reactive compounds, chain transfer agents, heat polymerization initiators, anaerobic polymerization initiators, polymerization inhibitors, fillers, adhesion improvers such as coupling agents, heat stabilizers, antibacterial and antifungal agents, flame retardants, matting agents, defoamers, leveling agents, wetting and dispersing agents, precipitation inhibitors, thickeners, anti-sagging agents, anti-flooding agents, emulsifiers, anti-slip and anti-scratch agents, anti-skinning agents, drying agents, antifouling agents, antistatic agents, conductive agents (electrostatic additives), and solvents. The different component may include one of these alone or two or more of these in combination. These components may be appropriately selected from known ones. The amounts of these to be added can be appropriately selected.

In particular, preferably, the sulfur-containing polymer composition contains the sulfur-containing polymer and at least one selected from the group consisting of an inorganic substance, a cross-linking agent, and an organic resin.

For example, when the sulfur-containing polymer composition contains the sulfur-containing polymer and an inorganic substance in combination, the composition can have the properties of the added inorganic substance, and the inorganic substance excellently disperses therein to significantly improve the transparency of the composition.

Examples of the inorganic substance include a metal, an inorganic oxide, an inorganic nitride, an inorganic carbide, an inorganic sulfide, and an inorganic hydroxide. The inorganic substance may include one of these alone or two or more of these in combination.

The inorganic substance preferably contains a metal.

Examples of the metal include lithium (Li), sodium (Na), potassium (K), magnesium (Mg), calcium (Ca), manganese (Mn), strontium (Sr), barium (Ba), titanium (Ti), zirconium (Zr), iron (Fe), cobalt (Co), nickel (Ni), copper (Cu), zinc (Zn), aluminum (Al), tin (Sn), and silicon (Si).

The inorganic oxide is preferably a metal oxide containing a metal element. Examples of the metal oxide include a single metal oxide containing one metal element, a composite oxide containing two or more metal elements, and a solid solution oxide of a different element in the single metal oxide or the composite oxide. The different element may be a metal element or a non-metal element other than oxygen, such as nitrogen or fluorine. Examples of the metal element include the metal elements described above.

Examples of the single metal oxide include magnesium oxide, calcium oxide, strontium oxide, barium oxide, titanium oxide, zinc oxide, cerium oxide, silicon oxide, tin oxide, zirconium oxide, aluminum oxide, and indium oxide.

Examples of the composite oxide include perovskite-type composite oxides such as barium titanate, barium strontium titanate, strontium titanate, barium zirconium strontium titanate, barium zirconium titanate, and lead zirconate titanate; spinel, spinel-type composite oxides such as lithium titanate; and aluminum titanate.

Examples of the solid solution oxide include solid solution oxides of a different metal element and/or a non-metal element other than oxygen (e.g., nitrogen or fluorine) in the single metal oxides or the composite oxides.

The inorganic nitride is preferably a metal nitride, and examples thereof include boron nitride, carbon nitride, and aluminum nitride.

The inorganic carbide is preferably a metal carbide, and examples thereof include silicon carbide, calcium carbide, titanium carbide, and boron carbide.

The inorganic sulfide is preferably a metal sulfide, and examples thereof include copper sulfide, zinc sulfide, and cadmium sulfide.

The inorganic hydroxide is preferably a metal hydroxide, and examples thereof include aluminum hydroxide, magnesium hydroxide, and barium hydroxide.

In particular, the inorganic substance is preferably an inorganic oxide, more preferably a metal oxide, because they are wide-band gap (visible light transparency).

Of these inorganic substances, oxides containing Ti, Zr, Ce, Zn, In, Al, Si, or Sn as a main component of the metal element are more preferred, and titanium oxide ($TiO_2$), zirconium oxide ($ZrO_2$), cerium oxide ($CeO_2$), zinc oxide ($ZnO$), indium oxide ($In_2O_3$), aluminum oxide ($Al_2O_3$), silicon oxide ($SiO_2$), and tin oxide ($SnO_2$) are particularly preferred, because these inorganic substances have no or little absorption in the visible light region and thus easily provide a colorless and transparent composition in which coloring due to the inorganic substances is reduced.

Of these inorganic substances, in order to provide a sulfur-containing polymer composition having higher transparency or to provide a lower thermal expansion sulfur-containing polymer composition, zirconium oxide, titanium oxide, and silicon dioxide are more preferred. In order to provide a sulfur-containing polymer composition having a higher refractive index, zirconium oxide and titanium oxide are more preferred. In order to provide a sulfur-containing polymer composition that has high relative permittivity and can be suitably used as a ferroelectric material or a piezoelectric material, perovskite-type composite oxides are preferred. In order to provide a sulfur-containing polymer composition that has high thermal conductivity and can be suitably used as a heat dissipating material, boron nitride, aluminum hydroxide, and aluminum titanate are preferred.

In order to provide a sulfur-containing polymer composition having antistatic properties or conductivity with less coloring due to the addition of inorganic substances, solid solution oxides of different metal elements or additive elements such as fluorine in zinc oxide (ZnO), indium oxide ($In_2O_3$), or tin oxide ($SnO_2$) are preferred. For example, a solid solution of In, Al, or Ga in zinc oxide, a solid solution of Sn or Ti in indium oxide, and a solid solution of Sb or F in tin oxide are more preferred.

The inorganic substance may have any shape and may be in the form of amorphous, particles, plate, or fibers, for example, and is preferably in the form of particles.

The inorganic substance may be surface-treated. The surface treatment may be performed by any method as long as it does not affect the effects of the present invention. Examples of the method include known methods such as a method of using a silane coupling agent, a method for reacting a compound having a phosphoric acid group with the inorganic substance, and a method for reacting a compound having a carboxylic acid group with the inorganic substance.

The inorganic substance preferably has an average particle size of 1 nm or greater and 1000 nm or smaller. An inorganic substance having an average particle size within the above range can improve the permeabilities in the visible light region and the infrared region. From the viewpoint of reducing organic resins, the average particle size of the inorganic substance is more preferably 5 nm or greater, still more preferably 10 nm or greater. The average particle size of the inorganic substance is more preferably 100 nm or smaller, still more preferably 50 nm or smaller, even more preferably less than 30 nm.

In order to pack the inorganic substance to the highest density, two or more inorganic substances having different particle sizes may be used.

The average particle size is determined as follows: the inorganic substance is observed by SEM (magnification: 1000 to 100000 times, preferably 10000 times), the image obtained is analyzed to determine the particle sizes (circular area equivalent diameters) of about 10 to 1000 particles (primary particles), and the 50% particle size is evaluated based on the particle size distribution based on the number. The image can be analyzed with known image analysis software (e.g., Mac-View available from Mountech Co., Ltd.).

The amount of the inorganic substance contained may be any amount, and may be appropriately selected according to the purpose and application of the sulfur-containing polymer composition. For example, in order to achieve higher transparency and lower thermal expansion, the amount of the inorganic substance contained is preferably 10 parts by mass or more, more preferably 30 parts by mass or more, still more preferably 50 parts by mass or more, particularly preferably 70 parts by mass or more, most preferably 80 parts by mass or more, relative to 100 parts by mass of the sulfur-containing polymer. In order to reduce the melt viscosity of the sulfur-containing polymer composition when formed into a resin molded article, the amount of the inorganic substance contained is preferably 90 parts by mass or less, more preferably 80 parts by mass or less, still more preferably 70 parts by mass or less, further preferably 50 parts by mass or less, relative to 100 parts by mass of the sulfur-containing polymer.

A non-limiting preferred example of the cross-linking agent is a curable organic compound having a curable functional group capable of reacting with the reactive functional group of the sulfur-containing polymer.

The term "curable functional group" refers to a functional group that undergoes a curing reaction with heat or light (a group that causes a curing reaction of a polymer composition).

Examples of the curable functional group include ring-opening polymerizable groups such as an epoxy group, an oxetane ring, an ethylene sulfide group, and an aziridine group; radical curable groups and/or addition curable groups such as an acrylic group, a methacrylic group, an allyl group, a vinyl group, and a maleimide group; addition-reactive groups such as a hydroxy group, a thiol group, and a hydrosilyl group; esterification reactive groups such as a carboxylic acid group, an oxazoline group, a hydroxy group, a thiol group, and an amino group; and urethane-forming or thiourethane-forming reactive groups such as an isocyanate group.

The curable organic compound is preferably a compound having a ring-opening polymerizable group (e.g., an epoxy group, an oxetane group, an ethylene sulfide group) that is curable by cationic curing, a compound having an acrylic group and/or a methacrylic group that is curable by radical curing, or a compound having a vinyl group that is curable by an addition reaction such as hydrosilylation or an ene-thiol reaction. Use of any of these compounds can reduce a primary curing time, which leads to good productivity, and can provide cured products excellent in heat resistance (thermal decomposition resistance and heat coloring resistance). Of these, a compound having a ring-opening polymerizable group that is curable by cationic curing and a compound having a thiol group that undergoes an ene-thiol reaction are more preferred from the viewpoint of achieving low shrinkage at the primary curing and easy shaping in molding with a metal mold or a resin mold, such as nanoimprinting. The compound having a ring-opening polymerizable group is a compound containing one or more ring-opening polymerizable groups per molecule. Preferably, the compound having a ring-opening polymerizable group is required to be a compound containing two or more ring-opening polymerizable groups in total. i.e., a polyfunctional compound. This can provide a resin composition having higher curing reactivity, excellent curability, and higher curing speed. Such a resin composition can provide a cured molded article in a shorter time.

When the reactive functional group of the sulfur-containing polymer has a reactive unsaturated bond, a cross-linking agent having a thiol group or a cross-linking agent having a reactive double bond is preferably used.

When the reactive functional group of the sulfur-containing polymer has a reactive ionic bond, a cross-linking agent having a thiol group, a cross-linking agent having a reactive ionic bond, or a cross-linking agent having an amine is preferably used.

When the reactive functional group of the sulfur-containing polymer is a hydroxy group, a cross-linking agent having a reactive double bond, a cross-linking agent having a reactive ionic bond, or a cross-linking agent having an isocyanate group is preferably used.

When the reactive functional group of the sulfur-containing polymer is a thiol group, a cross-linking agent having a reactive double bond, a cross-linking agent having a reactive ionic bond, or a cross-linking agent having an isocyanate group is preferably used.

Examples of the cross-linking agent having a thiol group include aliphatic polythiol compounds such as methanedithiol, 1,2-ethanedithiol, 1,2-bis[(2-mercaptoethyl)thio]3-mercaptopropane, and tris(mercaptoethylthio)methane; aromatic polythiol compounds such as 1,2-dimercaptobenzene, 1,3-dimercaptobenzene, 1,4-dimercaptobenzene, 1,3,5-tris(mercaptoethyleneoxy)benzene, 2,5-toluenedithiol, 3,4-toluenedithiol, 1,5-naphthalenedithiol, and 2,6-naphthalenedithiol; and heterocyclic polythiol compounds such as 2-methylamino-4,6-dithiol-sym-triazine, 3,4-thiophenedithiol, bismuthiol, 4,6-bis(mercaptomethylthio)-1,3-dithiane, and 2-(2,2-bis(mercaptomethylthio)ethyl)-1,3-dithiethane.

Examples of the cross-linking agent having a reactive double bond include compounds having an acrylic group, a methacrylic group, an allyl group, or a vinyl group. Specific examples include aromatic vinyl monomers such as divinylbenzene; aromatic allyl monomers such as diallyl phthalate and diallylbenzene phosphonate; vinyl ester monomers such as polyvinyl acetate; (meth)acrylic monomers such as (di)ethylene glycol di(meth)acrylate, propylene glycol di(meth)acrylate, trimethylolpropane di(meth)acrylate, trimethylolpropane tri(meth)acrylate, pentaerythritol tetra(meth) acrylate, dipentaerythritol hexa(meth)acrylate, adamantyl (meth)acrylate, fluorene (meth)acrylate, tris[2-(meth)acryloyloxyethyl]triazine; and triallyl cyanurate.

Examples of the cross-linking agent having a reactive ionic bond include a compound having an epoxy group, a compound having an oxetane ring, and an episulfide compound.

Examples of the compound having an epoxy group include aromatic epoxy compounds such as a bisphenol A-type epoxy compound, a bisphenol F-type epoxy compound, a fluorene epoxy compound, and an aromatic epoxy compound having a bromo substituent; aliphatic epoxy compounds such as those obtained by the condensation reaction of epihalohydrin and ethylene glycol, diethylene glycol, triethylene glycol, tetraethylene glycol, or polyethylene glycol (PEG600); alicyclic epoxy compounds such as 3,4-epoxycyclohexylmethyl-3',4'-epoxycyclohexanecarboxylate, epsilon-caprolactone-modified-3,4-epoxycyclohexylmethyl-3',4'-epoxycyclohexane carboxylate, and bis-(3,4-epoxycyclohexyl) adipate; and hydrogenated epoxy compounds such as a hydrogenated bisphenol A-type epoxy compound, a hydrogenated bisphenol S-type epoxy compound, and a hydrogenated bisphenol F-type epoxy compound.

Examples of the compound having an oxetane ring include aliphatic oxetane compounds such as 1,2-bis[(3-ethyl-3-oxetanylmethoxy)methyl]ethane and dipentaerythritol tetrakis(3-ethyl-3-oxetanylmethyl) ether; and aromatic oxetane compounds such as phenol novolac oxetane, a dioxetane compound having a biphenyl skeleton (available from UBE Corporation, ETERNACOLL® OXBP), a dioxetane compound having a phenyl skeleton (available from UBE Corporation, ETERNACOLL® OXTP), and a dioxetane compound having a fluorene skeleton.

Examples of the episulfide compound include aliphatic episulfide compounds such as bis(2,3-epithiopropyl)sulfide, bis(2,3-epithiopropyl)disulfide, and 1,3-bis(2,3-epithiopropylthio)cyclohexane; aromatic episulfide compounds such as 1,2-bis(2,3-epithiopropylthio)benzene and 1,3-bis(2,3-epithiopropylthio)benzene; and mercapto group-containing epithio compounds such as 3-mercaptopropylene sulfide and 4-mercaptobutene sulfide.

Examples of the crosslinking agent having an isocyanate group include aliphatic polyisocyanate compounds such as tetramethylene diisocyanate, hexamethylene diisocyanate, lysine triisocyanate, and xylylene diisocyanate; alicyclic polyisocyanate compounds such as isophorone diisocyanate, bis(isocyanatomethyl)cyclohexane, and 4,9-bis(isocyanatomethyl)tricyclodecane; aromatic polyisocyanate compounds such as tolylene diisocyanate, 4,4'-diphenylmethane diisocyanate, diphenyl sulfide-4,4-diisocyanate, and phenylene diisocyanate; heterocyclic polyisocyanate compounds such as 4,5-bis(isocyanatomethyl)-1,3-dithiolane; aliphatic polyisothiocyanate compounds such as bis(isothiocyanatoethyl) disulfide; alicyclicpolyisothiocyanate compounds such as 3,9-bis(isothiocyanatomethyl)tricyclodecane and 4,8-bis(isothiocyanatomethyl)tricyclodecane; aromatic polyisothiocyanate compounds such as tolylene diisothiocyanate; and sulfur-containing heterocyclic polyisothiocyanate compounds such as 2,5-diisothiocyanatothiophene and 2,5-bis(isothiocyanatomethyl)thiophene.

The amount of the cross-linking agent contained is preferably 0.1 to 1000 parts by mass, more preferably 1 to 500 parts by mass, still more preferably 5 to 100 parts by mass, further preferably 10 to 50 parts by mass, relative to 100 parts by mass of the sulfur-containing polymer.

In order to promote the reaction between the reactive functional group of the sulfur-containing polymer and a cross-linking agent, a curing catalyst or a curing agent may be used in combination. The curing catalyst and the curing agent can be appropriately selected depending on the reaction.

When thermal curing or thermal reaction is performed, the curing catalyst and the curing agent may be, for example, a thermal latent cationic curing catalyst, a photolatent cationic curing catalyst, a thermal latent radical curing catalyst, a photolatent radical curing catalyst, an acid anhydride curing agent, a phenol curing agent, or an amine curing agent. Preferred among these are a thermal latent cationic curing catalyst and a thermal latent radical curing catalyst. In order to reduce the shrinkage of the cured product, a heat latent cationic curing catalyst is particularly preferably used. When reaction is performed by active energy ray irradiation, a curing agent, a photolatent cationic curing catalyst, or a photolatent radical curing catalyst is preferably used. In order to reduce the shrinkage of the cured product, a photolatent cationic curing catalyst is particularly preferably used. The curing catalyst and cured agent may include one of these alone or two or more of these in combination.

The thermal latent cationic curing catalyst and the photolatent cationic curing catalyst are each preferably an onium salt or a boron compound (boron complex).

Suitable examples of the thermal latent radical curing catalyst include organic peroxides such as cumene hydroperoxide and azo compounds such as 2,2'-azobis(isobutyronitrile).

Examples of the photolatent radical curing catalyst include acetophenones such as acetophenone and diethoxyacetophenone; benzoins such as benzoin and benzoin methyl ether; benzophenones such as benzophenone and methyl o-benzoylbenzoate; thioxanthones such as 2-isopropylthioxanthone; xanthones; anthraquinones such as 2-methylanthraquinone; and sylphosphine oxides.

The amount of the curing catalyst contained is preferably 0.01 to 10% by mass based on 100% by mass of the sulfur-containing polymer composition.

In curing by active energy ray irradiation, a photosensitizer is preferably used in combination with the photolatent curing catalyst.

Preferred examples of the photosensitizer include amines such as triethanolamine, methyldiethanolamine, triisopropanolamine, methyl 4-dimethylaminobenzoate, ethyl 4-dimethylaminobenzoate, isoamyl 4-dimethylaminobenzoate, ethyl (2-dimethylamino)benzoate, (n-butoxy)ethyl 4-dimethylaminobenzoate, and 2-ethylhexyl 4-dimethylaminobenzoate.

The amount of the photosensitizer added is preferably 0.1 to 20% by mass based on 100% by mass of the sulfur-containing polymer composition.

Examples of the curing agent include commonly used curing agents such as acid anhydride curing agents, phenol curing agents, and amine curing agents.

Examples of the acid anhydride curing agents include aliphatic carboxylic acid anhydrides such as tetrahydrophthalic anhydride and polydodecanedianhydride; and aromatic carboxylic acid anhydrides such as phthalic anhydride, trimellitic anhydride, pyromellitic anhydride, and biphenyltetracarboxylic acid anhydride.

When any of the acid anhydride curing agents, phenol curing agents, or amine curing agents are used, a curing accelerator is preferably used in combination therewith. Examples of the curing accelerator include acid salts of organic bases and aromatic compounds having a tertiary nitrogen atom. Examples of the acid salts of organic bases include organic onium salts such as organic phosphonium salts and organic ammonium salts; and acid salts of organic bases having a tertiary nitrogen atom.

Examples of the organic phosphonium salts include phosphonium bromides having four phenyl rings, such as tetraphenylphosphonium bromide and triphenylphosphine-toluene bromide.

Examples of the organic ammonium salts include tetra (C1-C8) alkylammonium bromides such as tetraoctylammonium bromide, tetrabutylammonium bromide, and tetraethylammonium bromide.

Examples of the acid salts of organic bases having a tertiary nitrogen atom include organic acid salts of alicyclic bases having a tertiary nitrogen atom in a ring and organic acid salts of various imidazole compounds.

The curing accelerator may include one of these alone or two or more of these in combination.

The amount of the curing accelerator used is preferably 0.01 to 5% by mass, more preferably 0.03 to 3% by mass, based on 100% by mass of the sulfur-containing polymer composition.

The organic resin may be any organic resin other than the sulfur-containing polymer. Examples include conventionally known polymer materials including: polyolefins such as polyethylene, polypropylene, and cyclic polyolefins; vinyl polymers such as polyvinyl chloride, polyvinylidene chloride, polystyrene, polyvinyl acetate, and polyvinyl alcohol; (meth)acrylic resins; polyurethanes; fluororesins such as polytetrafluoroethylene; ABS resin; AS resin; polyamides; polyacetals; polycarbonate; modified polyphenylene ethers; polyesters such as polyethylene terephthalate and polybutylene terephthalate; amorphous polyarylates; liquid crystal polymers; polyetheretherketone; polyimides; silicone resins; polyamide-imides; cellulosic polymers; epoxy resin; urea resin; melamine resin; phenolic resin; urethane resin; unsaturated polyester resin; diallyl phthalate resin; alkyd resins; and fluorene-containing resins. Preferred among these are polystyrene, polycarbonate, fluorene-containing resins, and cyclic polyolefins.

When the organic resin is contained, in order to achieve higher refractive index, the amount of the organic resin is preferably 10% by mass or more, more preferably 30% by mass or more, still more preferably 50% by mass or more, based on 100% by mass of the total solids of the sulfur-containing polymer composition. In order to increase curability and heat resistance, the amount of the organic resin contained is preferably less than 90% by mass, more preferably less than 80% by mass, still more preferably less than 70% by mass, based on 100% by mass of the total solids of the sulfur-containing polymer composition.

The sulfur-containing polymer composition preferably has a glass transition temperature (Tg) of 80° C. to 250° C. A sulfur-containing polymer composition having a glass transition temperature within the above range can be easily molded and processed. In order to achieve higher heat resistance, the glass transition temperature is more preferably 90° C. or higher, still more preferably 100° C. or higher. In order to achieve easy molding and processing, Tg is more preferably 200° C. or lower.

The glass transition temperature can be determined by the same method as for the glass transition temperature of the sulfur-containing polymer described above.

The sulfur-containing polymer composition preferably has a refractive index of 1.69 or higher. A sulfur-containing polymer composition having a refractive index within the above range is suitable for an optical material or the like. The refractive index is more preferably 1.70 or higher, still more preferably 1.71 or higher.

The refractive index can be determined by the same method as for the refractive index of the sulfur-containing polymer described above.

The sulfur-containing polymer composition preferably has an Abbe number of 10 or greater. A sulfur-containing polymer composition having an Abbe number within the above range causes less light dispersion and can be an optical material suitable for lenses and the like. The Abbe number is more preferably 15 or greater, still more preferably 18 or greater, further preferably 20 or greater. In order to control light dispersion, the Abbe number is more preferably 60 or smaller, still more preferably 55 or smaller.

The Abbe number can be determined by the same method as for the Abbe number of the sulfur-containing polymer described above.

The sulfur-containing polymer composition preferably has a visible transmittance of 70% or higher. A sulfur-containing polymer composition having a visible transmittance within the above range is suitable for an optical material. The visible transmittance is more preferably 80% or higher, still more preferably 85% or higher, even more preferably 88% or higher.

The visible transmittance is a parallel transmittance and can be determined by the same method as for the visible transmittance of the sulfur-containing polymer described above.

When the sulfur-containing polymer composition contains no inorganic substance, in order to achieve higher refractive index, the sulfur-containing polymer composition preferably has a density of 1.1 $g/cm^3$ or more, more preferably 1.3 $g/cm^3$ or more, still more preferably 1.4 $g/cm^3$ or more, even more preferably 1.6 $g/cm^3$ or more, particularly preferably 1.8 $g/cm^3$ or more. In order to achieve light weight, the sulfur-containing polymer composition preferably has a density of less than 3.0 $g/cm^3$, more preferably less than 2.5 $g/cm^3$, still more preferably less than 2.0 $g/cm^3$.

The sulfur-containing polymer composition may be produced by any method and may be produced by mixing the sulfur-containing polymer, the inorganic substance, and optionally a different component. Thereby, the sulfur-containing polymer composition can be produced. The mixing may be performed with a known means such as a bead mill, a roll mill, a ball mill, a jet mill, a kneader, or a blender.

The sulfur-containing polymer composition is preferably thermoplastic. The sulfur-containing polymer composition containing the sulfur-containing polymer has a high refractive index and properties that are required to provide heat resistance. When the sulfur-containing polymer composition is thermoplastic, it has good molding processability and can be easily used for various applications requiring the above-described properties.

The sulfur-containing polymer and the sulfur-containing polymer composition each may be cured by any curing method and can be cured by heating or active energy ray irradiation, or a known method including a combination of these. The curing method may be appropriately selected according to the type of the reactive functional group of the sulfur-containing polymer and the purpose and application of the sulfur-containing polymer composition.

The heating may be performed by any method, and may be performed, for example, at 40° C. to 400° C. for 30 seconds to 48 hours, preferably at 50° C. to 300° C. for 10 minutes to 30 hours, more preferably at 120° C. to 260° C. for 30 minutes to 3 hours.

Non-limiting examples of the active energy rays include known active energy rays such as electron beams, ultraviolet rays, and visible light. The amount of active energy ray irradiation is not limited, and may be appropriately selected according to the purpose and application of the sulfur-containing polymer and the sulfur-containing polymer composition.

A cured product obtainable by curing the sulfur-containing polymer and a cured product obtainable by curing the sulfur-containing polymer composition each have a high refractive index and various properties owing to the reactive functional group of the sulfur-containing polymer and can be suitably used for optical applications and the like.

The present invention encompasses such a cured product of the sulfur-containing polymer. The present invention also encompasses a cured product of the sulfur-containing polymer composition.

3. Applications

The sulfur-containing polymer and the sulfur-containing polymer composition of the present invention are used in optical applications and other applications, preferably used in optical applications. Specifically, the sulfur-containing polymer and the sulfur-containing polymer composition are used in various applications such as imaging lenses, optical materials (components), materials of machine parts, materials of electric and electronic parts, materials of automobile parts, materials for civil engineering and construction, molding materials, and materials of paints and adhesives. In particular, the sulfur-containing polymer and the sulfur-containing polymer composition are suitably used for optical materials, optical device components, and display device components. Specific examples of these applications include: optical applications including lenses such as spectacle lenses, imaging lenses for cameras (e.g., (digital) cameras, cameras for mobile phones, and in-vehicle cameras), light beam condensing lenses, and light diffusing lenses, sealing materials for LEDs, optical adhesives, optical adhesive materials, optical transmission bonding materials, filters, diffraction gratings, diffractive optical elements, prisms, light guides, watch glasses, and transparent glasses and cover glasses such as cover glasses for display devices; optical-device applications including photosensors such as optical sensors (e.g., CMOS sensors, TOF sensors), photoswitches, LEDs, micro-LEDs, light emitting devices, optical waveguides, multiplexers, demultiplexers, disconnectors, optical dividers, and optical fiber adhesives; and display device applications including substrates for display elements such as LCDs, organic ELs, and PDPs, color filter substrates, touch panel substrates, index matching materials used for touch panels and the like, hard coats, brightness enhancement films, prism films, lenticular sheets, microlens sheets, display protective films, display backlights, light guide plates, antireflection films, antifogging films, and light extraction improvers for LEDs, organic EL, and the like.

The sulfur-containing polymer and the sulfur-containing polymer composition of the present invention also have excellent heat resistance, and thus can be suitably used for heat resistant materials, ferroelectric materials, heat dissipating materials, separators for battery materials, filters such as gas separation membranes and liquid separation membranes, and the like.

The sulfur-containing polymer and the sulfur-containing polymer composition of the present invention also do not have an absorption in a wide range of the visible and infrared regions, and are suitably used as optical materials in the visible and infrared regions. Owing to the excellent heat resistance, the sulfur-containing polymer and the sulfur-containing polymer composition of the present invention can also be used for electrode materials of batteries such as fuel batteries and Li batteries and battery components such as electrolyte materials. The sulfur-containing polymer and the sulfur-containing polymer composition can also be suitably used as materials utilizing low dielectric properties, such as an insulating material and an antenna material.

The sulfur-containing polymer and the sulfur-containing polymer composition of the present invention can be suitably used as a molding material. The sulfur-containing polymer and the sulfur-containing polymer composition may be molded by known molding techniques such as injection molding, a T-die method, an inflation method, imprint molding, or nanoimprint molding, using a mold such as a metal mold or a resin mold. The sulfur-containing polymer and the sulfur-containing polymer composition may be molded into a desired shape by casting, application, or other techniques. Non-limiting examples of the shape include various known shapes including a lens, a sheet, and a film.

Also, the sulfur-containing polymer and the sulfur-containing polymer composition of the present invention is suitable for processing by a known etching process such as plasma etching or by a known resist process utilizing solubility differences. The sulfur-containing polymer and the sulfur-containing polymer composition of the present invention is also suitable for coating such as spin coating, bar coating, squeegee coating, or inkjet coating.

In order to achieve good processability, the sulfur-containing polymer composition of the present invention is preferably a thermoplastic resin composition. In order to achieve low viscosity and good followability to a fine metal mold or a fine resin mold in molding, the sulfur-containing polymer composition is preferably a curable resin composition.

As described above, the sulfur-containing polymer and the sulfur-containing polymer composition of the present invention can have a high refractive index and can have various properties suitable for the purpose thereof. Therefore, the sulfur-containing polymer and the sulfur-containing polymer composition can be suitably used in a wide range of applications including optical applications.

EXAMPLES

The present invention is described in more detail with reference to, but not limited to, examples. It should be noted that the terms "part(s)" and "%" refer to "part(s) by mass" and "% by mass", respectively, unless otherwise stated.

In the examples, each evaluation was performed by the following methods.

<Weight Average Molecular Weight (Mw), Number Average Molecular Weight (Mn), Degree of Dispersibility (Mw/Mn)>

The weight-average molecular weight and the number-average molecular weight of a polymer were determined by gel permeation chromatography (GPC) under the following conditions. The degree of dispersibility was calculated by dividing the weight average molecular weight by the number average molecular weight.

Apparatus: CBM-20A available from Shimadzu Corporation

Detector: differential refractive index detector (RI) (SPD-20MA available from Shimadzu Corporation) and UV-vis-infrared spectrophotometer (SPD-20MA available from Shimadzu Corporation)

Column: TSKgel SuperHM-N available from Tosoh Corporation

Column temperature: 40° C.

Flow rate: 0.3 mL/min

Calibration curve: Polystyrene Standards

Eluent: chloroform

<$^1$H-NMR, $^{13}$C-NMR, DOSY-NMR>

A polymer produced was subjected to $^1$H-NMR, $^{13}$C-NMR, or DOSY-NMR analysis under the following conditions.

Apparatus: nuclear magnetic resonance apparatus (600 MHz) available from Agilent Technologies Japan, Ltd.

Solvent for measurement: deuterated chloroform

Preparation of sample: a few milligrams to tens of milligrams of a polymer produced was dissolved in a solvent for measurement.

<IR>

IR analysis was performed under the following conditions.

Apparatus: Fourier transform infrared spectrophotometer (FT/IR-6100) available from JASCO Corporation Preparation of sample: about 2 mg of a sample was mixed with about 300 mg of dry potassium bromide (KBr) and the mixture was ground with a mortar and pestle and molded.

<Refractive Index ($n_D$)>

A film produced was subjected to measurement of the phase difference between polarization of incident light and polarization of transmitted light and the ratio of angle of deviation of reflected light using a spectroscopic ellipsometer UVISEL available from HORIBA Scientific. The complex refractive index was determined using the pre-selected wavelength (450 nm) and incident angle (75°) of the incident light. The refractive index in the range of 190 to 2000 nm was calculated and the refractive index at a wavelength of 589.3 nm was determined.

Unless otherwise specified, the film was produced as follows: 30 mg of a sulfur-containing polymer or sulfur-containing polymer composition was dissolved in 1,1,2,2-tetrachloroethane (1 mL), the mixture was passed through a membrane filter with a pore size of 0.2 μm, and a 0.4-mL portion of the filtrate was drop-cast onto a glass substrate (2 cm×2 cm) to obtain a film having a thickness of about 50 nm, which was subjected to the measurement.

<Abbe Number ($\nu_D$)>

A film produced was subjected to measurement of refractive indexes using the D line (589.3 nm), the F line (486.1 nm), and the C line (656.3 nm) with a spectroscopic ellipsometer UVISEL available from HORIBA Scientific, and the Abbe number ($\nu_D$) was calculated using the following calculation formula (A):

$$\text{Abbe number}(\nu_D)=(n_D-1)/(n_F-n_C) \quad (A)$$

In the formula, $n_D$, $n_F$, and $n_C$ are the refractive indexes at the Fraunhofer D line (589.3 nm), the Fraunhofer F line (486.1 nm), and the Fraunhofer C line (656.3 nm), respectively.

Unless otherwise specified, the film was produced as in the above-described measurement of refractive index. Thereby, a 50-nm thick film was obtained and subjected to the measurement.

<Glass Transition Temperature (Tg)>

A DSC curve was created using a differential scanning calorimeter available from Seiko Instruments Inc. under the conditions that α-alumina was used as a reference and the temperature was increased from room temperature to 250° C. at a temperature-increasing rate of 10° C./min, and evaluation was performed based on the intersection of the baseline and the tangent line at the inflection point of the DSC curve.

<Element Content Ratio (O/S Ratio)>

A film prepared as a sample by applying 0.25 mL of a polymer solution to a silicon wafer by spin coating was subjected to measurement using a photoelectron spectrometer (JPS-9010TR, XPS, light source: Mg, X-ray output: 400 W) available from JEOL Ltd. The integration ratio of the peak intensities was calculated to determine the element content ratio of the oxygen atoms attached to the sulfur atoms in the main chain of the polymer to the sulfur atoms in the main chain (O/S ratio).

As for the measurement method, the binding energy position, and the like, Handbook of X-ray Photoelectron Spectroscopy (published by JEOL Ltd. in March 1991) was used as a reference.

<Binding Energy>

A film prepared as a sample by applying 0.25 mL of a polymer solution to a silicon wafer by spin coating was subjected to measurement of the binding energy from the peak position of the 2p3/2 orbital of the sulfur atom using a photoelectron spectrometer (JPS-9010TR, X-ray photoelectron spectrometer) available from JEOL Ltd.

<Transmittance (T %) of Thin Film>

A thin film produced was subjected to measurement of transmittance using a spectrophotometer (UV-visible-infrared spectrophotometer V-700 series available from JASCO Corporation). The visible transmittance was evaluated by the transmittance at a wavelength of 400 nm and the average transmittance in the range of 400 to 700 nm. In Examples 7, 9, 10, and 11, a glass substrate was used as a control. In other examples, air was used as a control sample.

Unless otherwise specified, the film was produced as follows. An about 5% solution of the polymer in an organic solvent that can dissolve the polymer was prepared. The resulting solution was applied to a glass substrate, which had little absorption for visible light, by spin coating at about 500 rpm for 60 seconds and dried at 100° C. for 10 minutes to form a 1-μm thin film. The transmittance of the drop-cast film indicates the transmittance at the measured thickness.

Example 1

<Sulfur-Containing Polymer 1>

(Synthesis of Methoxy-Substituted Polyphenyl Sulfide Resin (OMePPS))

A 1000-mL conical beaker was charged with chloroform (300 mL), 2-methoxybenzenethiol (28.0 g, 0.2 mol), and a solution of iodine (25.4 g, 0.1 mol) in methanol (300 mL), followed by stirring for an hour at room temperature. Then, an aqueous solution of sodium thiosulfate was added thereto to remove iodine, and the solvent was distilled off. The reaction solution was dispersed in diethyl ether, and the dispersion was subjected to liquid-liquid extraction by washing first with an aqueous hydrochloric acid solution (3% by mass), then with an aqueous sodium hydroxide solution (5% by mass), and finally with pure water. The washed solution was dehydrated, subjected to removal of the solvent, and dried in a vacuum to obtain bis(2-methoxyphenyl) disulfide.

In a 50-mL three-necked flask, the resulting bis(2-methoxyphenyl) disulfide (5.568 g, 20 mmol) was added to a solution (20 mL) of 2,3-dichloro-5,6-dicyano-p-benzoquinone (DDQ, 1 M) and trifluoroacetic acid (1 M) in dichloromethane, followed by oxidative polymerization with stirring at room temperature for 20 hours. By-products were removed from the polymerization solution with a glass filter, the polymerization solution was added dropwise to methanol acidified with hydrochloric acid to produce and precipitate the polymer, and the precipitates were separated by filtration through a glass filter and collected as powder. Then, the powder was washed first with an aqueous potassium hydroxide solution (0.1 M), then with pure water, and finally with methanol, and dried in a vacuum. Thereby, a methoxy-substituted polyphenyl sulfide resin (OMePPS) was synthesized. The molecular weight (Mw) was 4200 and the degree of dispersibility was 1.7. The glass transition point Tg was 118° C., the 5% weight loss temperature Td5 was 317° C., the molar extinction coefficient ε was $6.2\times10^2$ L/(mol·cm), the refractive index was 1.73, and the Abbe number was 22. The OMePPS, which is amorphous and soluble in chloroform, tetrahydrofuran, N,N'-dimethylacetamide, and N,N'-dimethylformamide, can be formed into a transparent thin film by drop-casting.

(Synthesis of Thiol-Terminated Methoxy-Substituted Polyphenyl Sulfide Resin (SH—OMePPS))

In a 100-mL three-necked flask, the OMePPS (2.0 g) was dissolved in tetrahydrofuran (THF, 40 mL). Sodium borohydride (2 g, excess amount) was added thereto, methanol (1 mL) was added dropwise thereto with stirring, and the solution was then heated under reflux at 65° C. for 20 hours. After completion of the reaction, the resulting solution was subjected to purification by precipitation in methanol acidified with hydrochloric acid (600 mL, containing 5 vol % hydrochloric acid), and the precipitates were separated by filtration through a glass filter, and washed with methanol and water. The resulting substance was dried in a vacuum overnight (25° C., 12 hours) to obtain a thiol-terminated methoxy-substituted polyphenyl sulfide resin (SH—OMePPS) (yield 81%, terminal thiol concentration 100%).

(Synthesis of Carboxyl-Terminated Methoxy-Substituted Polyphenyl Sulfide Resin (COOH—OMePPS))

In a 10-mL recovery flask, the SH—OMePPS (1.3 g, —SH group concentration 0.6 mmol, 1 eq.) was dissolved in dimethylformamide (DMF, 3 mL). 4-Pentenoic acid (600 mg, 6 mmol, 10 eq.) and 2,2-dimethoxy-2-phenylacetophenone (DMPA, 31 mg, 0.12 mmol, 0.2 eq.) were added thereto. The mixture was degassed five times by freeze-pump-thaw cycles (Ar gas) and subjected to a thiol-ene reaction by being exposed to UV irradiation at room temperature for four hours (Hg lamp, hv=365 nm). After completion of the reaction, the solution was diluted with DMF (10 mL), and the dilution was subjected to purification by precipitation in methanol acidified with hydrochloric acid (300 mL, containing 5 vol % hydrochloric acid). The precipitates were separated by filtration through a glass filter, washed with methanol and water, and dried in a vacuum overnight (25° C., 12 hours). Thus, a carboxyl-terminated methoxy-substituted polyphenyl sulfide resin (COOH—OMePPS) (sulfur-containing polymer 1) was obtained (yield 88%, terminal carboxylic acid concentration 90%).

In measurement with an infrared spectrophotometer (IR) of the resin, the absorption of the S—H stretching vibration was observed at 2560 $cm^{-1}$ only for SH—OMePPS, and the absorption of the C═O stretching vibration was confirmed at 1740 $cm^{-1}$ only for COOH-MePPS. The percentage of carboxylic acid in COOH-MePPS was determined by neutralization titration to be 89%.

A chemical reaction formula of the synthesis of COOH—OMePPS from OMePPS is shown below. Table 1 shows various physical properties of each polymer produced.

[Chem. 12]

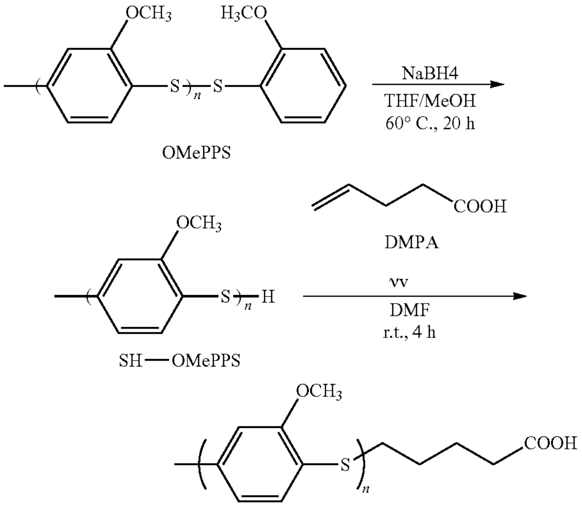

OMePPS

SH—OMePPS

COOH—OMePPS

TABLE 1

| Polymer | Mn ($\times10^3$) | Mw ($\times10^3$) | Mw/Mn | $n_D$ | $\nu_D$ |
|---|---|---|---|---|---|
| OMePPS | 2.5 | 4.2 | 1.7 | 1.73 | 22 |
| SH—OMePPS | 2 | 3.2 | 1.7 | 1.73 | 22 |
| COOH—OMePPS | 2.1 | 4.3 | 2.0 | 1.72 | 21 |

Table 1 shows that COOH—OMePPS, which is a sulfur-containing polymer having a carboxyl group, is a high refractive index material having a refractive index of 1.7 or higher.

<Preparation of Titanium Oxide Hybrid Film of Sulfur-Containing Polymer 1 by Sol-Gel Method>

In a 10 mL sample vessel, the COOH—OMePPS (0.0274 g) was dissolved in dimethylacetamide (1.5 mL). Hydrochloric acid (37% by mass, 25 μL) was added thereto, followed by stirring at room temperature for 30 minutes. In advance, tetrabutyl orthotitanate (50 μL) was dissolved in 1-butanol (100 μL) in a glove box to prepare a solution. The solution was added dropwise to the polymer solution, and the mixture was reacted for another 30 minutes. After completion of the reaction, impurities were removed from the reaction solution with a membrane filter, and the reaction solution was diluted with dimethylacetamide to prepare a hybrid solution (sulfur-containing polymer composition) having a solute concentration of 60 mg/mL and a hybrid solution (sulfur-containing polymer composition) having a solute concentration of 15 mg/mL.

The hybrid solution having a solute concentration of 60 mg/mL was dropped onto a silicon wafer, spin-coated at 2000 rpm for 20 seconds, and then heat-treated at 0.08 MPa and 60° C. for four hours and at 0.08 MPa and 150° C. for three hours. Thus, a 0.13-μm thick hybrid film was obtained.

Separately, the hybrid solution having a solute concentration of 15 mg/mL (400 μL) was dropped on a glass substrate, and heat-treated at 0.08 MPa and 60° C. for four hours and 0.08 MPa and 150° C. for three hours. Thus, a 5.5-μm thick hybrid film was obtained.

In IR analysis of each hybrid film, the absorption derived from —OH groups on the $TiO_2$ domain surface was observed at 3400 $cm^{-1}$ and the absorption of the Ti—O—Ti stretching vibration was observed at 610 $cm^{-1}$. Thereby, the formation of $TiO_2$ was confirmed.

Table 2 shows various physical property values of hybrid solutions different in $TiO_2$ content each containing the COOH—OMePPS (Experimental Examples 1-1 to 1-4). The refractive index and Abbe number were measured for each hybrid film formed on a silicon wafer.

FIG. 1 shows photographs of a hybrid film formed on a glass substrate using a sulfur-containing polymer composition containing the sulfur-containing polymer and $TiO_2$, with the ratio of the sulfur-containing polymer and $TiO_2$ being varied. FIG. 1 (*a*) shows the cases where the solid mass ratio of (COOH—OMePPS/$TiO_2$) is (100/0), (90/10), (70/30), and (50/50) in order from the left. FIG. 1 (*b*) shows the case where the (OMePPS/$TiO_2$) is (80/20).

TABLE 2

| Experimental Example | $TiO_2$ content (wt %) | Tg (° C.) | $n_D$ | $v_D$ |
|---|---|---|---|---|
| 1-1 | — | 123 | 1.72 | 21 |
| 1-2 | 10 | 131 | 1.77 | 18 |
| 1-3 | 30 | 141 | 1.80 | 19 |
| 1-4 | 50 | 136 | 1.85 | 17 |

Table 2 shows that the COOH—OMePPS hybrid film having a $TiO_2$ content of 50% by mass has $n_D$ of 1.85 and Tg of 136° C. These parameters demonstrated that the polymer compositions containing COOH—OMePPS and a metal oxide had a high refractive index, excellent transparency, and excellent heat resistance.

In addition, FIG. 1(*a*) demonstrated that COOH—OMePPS, which contained a reactive functional group, had a high refractive index and maintained transparency even when it contained 50% of $TiO_2$. On the other hand, FIG. 1(*b*) demonstrated that OMePPS, which contained no reactive functional group, containing 20% of $TiO_2$ became cloudy. These results indicated that the introduction of carboxyl groups contributed to the improvement of transparency.

Example 2

<Sulfur-Containing Polymer 2>

(Synthesis of Methyl-Substituted Polyphenyl Sulfide Resin (Methyl-Substituted PPS))

A methyl-substituted polyphenyl sulfide resin (MePPS) was obtained as in (Synthesis of OMePPS) described above in Example 1, except that bis(3-methylphenyl) disulfide was obtained using m-toluenethiol instead of 2-methoxybenzenethiol and was used to synthesize the polymer.

(Synthesis of Carboxyl Group-Containing Methyl-Substituted PPS)

The obtained methyl-substituted PPS and an acrylic acid monomer (2-carboxyethyl acrylate) were mixed in a mass ratio of 5/1 or 3/1. Each mixture was degassed, exposed to light using a UV lamp (SP-9 available from Ushio Inc., Light source: Xe, Hg) (wavelength: 230 nm to 320 nm, illuminance: 30 $mW/cm^2$), and subjected to purification by precipitation in acidic methanol. Thus, polycarboxylic acid-terminated methyl-substituted PPS (carboxyl group-containing methyl-substituted PPS) (sulfur-containing polymer 2) was obtained as white powder. A synthesis reaction formula of the carboxyl group-containing methyl-substituted PPS is shown below. In the formula, the compound (1) represents a methyl-substituted PPS, and the compound (4) represents a carboxyl group-containing methyl-substituted PPS.

The percentage of a carboxyl group introduced was determined by $^1$H-NMR. In DOSY-NMR analysis, a peak derived from methyl-substituted PPS and a peak derived from acrylic acid were observed on the same diffusion coefficient, confirming the formation of the copolymer. Table 3 shows various physical property values of MePPS and the carboxyl group-containing methyl-substituted PPS produced (Experimental Examples 2-1 to 2-3). The polymer produced had a refractive index decreased by introduction of acrylic acid units, but the refractive index was high of 1.7 or higher.

[Chem. 13]

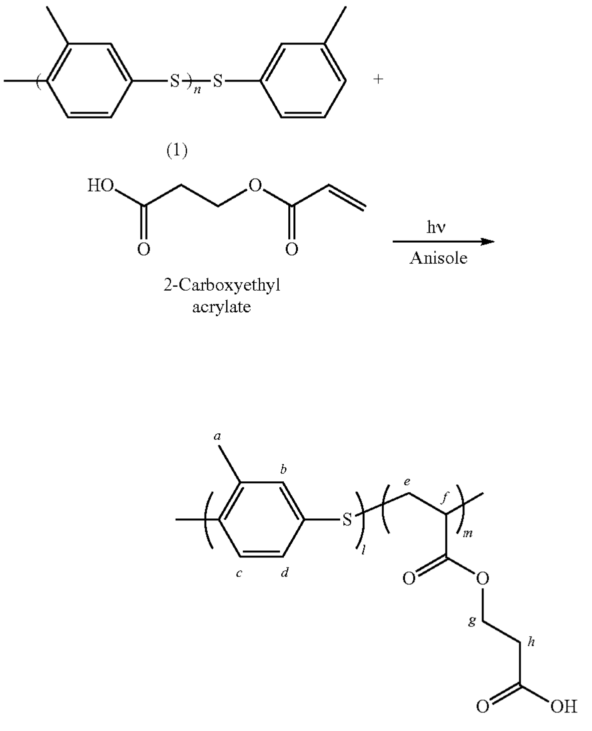

(1)

2-Carboxyethyl acrylate (4)

TABLE 3

| Experimental Example | Addition amount (mass ratio) MePPS/2-carboxyethyl acrylate | Ratio of structural unit m/(l + m) | Yield (%) | Mn ($\times 10^3$) | Mw ($\times 10^3$) | Mw/Mn | $n_D$ | $v_D$ |
|---|---|---|---|---|---|---|---|---|
| 2-1 | — | — | — | 0.6 | 1.3 | 2.0 | 1.76 | 19 |
| 2-2 | 5/1 | 0.08 | 32 | 0.7 | 2.5 | 3.4 | 1.74 | 21 |
| 2-2 | 3/1 | 0.16 | 30 | 0.9 | 3.3 | 3.7 | 1.73 | 22 |

Note)
The letter m represents the number of moles of acrylic acid monomer units and the letter l represents the number of moles of MePPS units.

<Preparation of Nanoparticle Dispersion of Carboxyl Group-Containing Methyl-Substituted PPS>

A solution (1 mL, 30 mg/mL) of the carboxyl group-containing methyl-substituted PPS in toluene was mixed with 20 μL of a zirconia nanoparticle-dispersed methyl ethyl ketone solution (Nippon Shokubai Co., Ltd., ZP-153, concentration 70% by mass) to obtain a nanoparticle dispersion (sulfur-containing polymer composition).

The dispersion was spin-coated onto a silicon wafer or drop-cast onto a glass substrate to form a film having a thickness of about 0.1 μm.

As a result of visual observation of the nanoparticle dispersion and each thin film, the fine particles were found to be dispersed therein. The nanoparticle dispersion had a refractive index of 1.73.

Comparative Example 1

A nanoparticle dispersion was obtained as in Example 2, except that the methyl-substituted PPS was used instead of the carboxyl group-containing methyl-substituted PPS in the preparation of the nanoparticle dispersion. This nanoparticle dispersion was used to form a film (Comparative Example 1).

Figure 2:
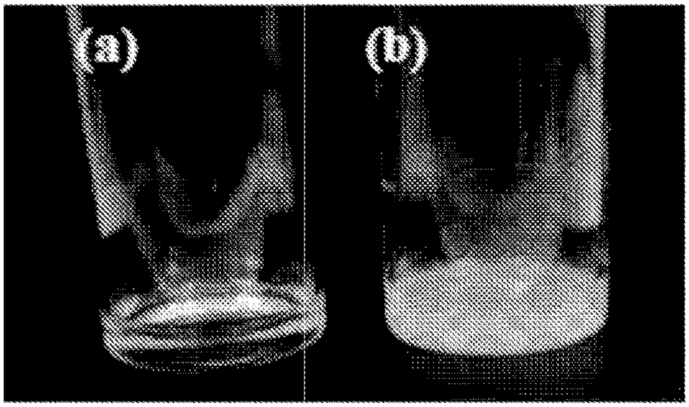
FIG. 2 shows photographs of nanoparticle dispersions of Example 2 and Comparative Example 1.
Figure 3:
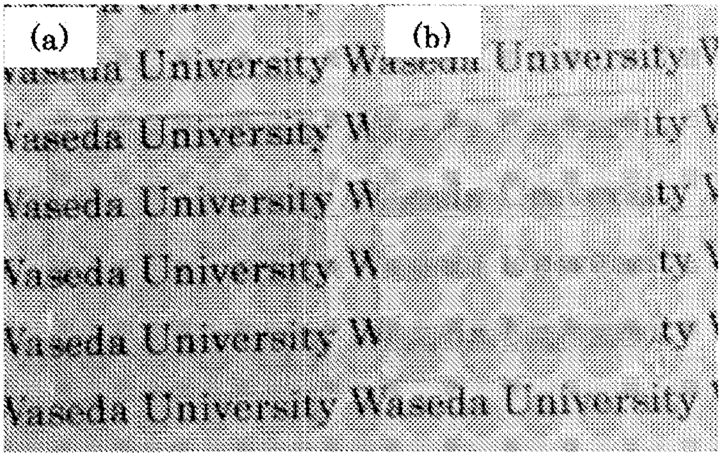
FIG. 3 shows photographs of hybrid films prepared from the nanoparticle dispersions of Example 2 and Comparative Example 1.

FIG. 2 shows photographs of the nanoparticle dispersion obtained above. FIG. 3 shows photographs of a hybrid film prepared from the nanoparticle dispersion. FIG. 2(*a*) and FIG. 3(*a*) show the nanoparticle dispersion containing the carboxyl group-containing methyl-substituted PPS of Example 2 and the hybrid film prepared from the dispersion, respectively. FIG. 2(*b*) and FIG. 3(*b*) show the nanoparticle dispersion containing the methyl-substituted PPS of Comparative Example 1 and the hybrid film prepared from the dispersion, respectively.

These results demonstrated that the sulfur-containing polymer compositions of the examples had a higher refractive index and better transparency than the sulfur-containing polymer composition of the comparative example. These results also demonstrated that the presence of nanoparticles achieved lower thermal expansion.

Example 3

(Surface Modification of Zirconia Nanoparticles)

The following procedure was performed with reference to S. Kawaguchi et al., Macromolecules, 2017, 50, 9713-9725. A 100-mL recovery flask was charged with p-toluic acid (0.15 g, 23% relative to nanoparticles), methanol (15 mL), toluene (0.5 mL), and an aqueous dispersion of zirconia ($ZrO_2$) nanoparticles (ITEC Co., Ltd., average particle size 4 nm, 30% by mass) (1.8 g, nanoparticles 0.54 g), followed by stirring at room temperature for two hours. About 20 mL of a methanol-toluene solution mixture (volume ratio of methanol/toluene=7/3) was added thereto, the solvent was removed using an evaporator until the total amount reached about 5 mL, another methanol-toluene solution mixture was added thereto, and the solvent was removed again. This operation was repeated about 6 times while changing the percentage by volume of methanol from 70% to 100%. Acetone was added to the resulting surface-modified zirconia nanoparticles, and the supernatant was removed to remove unreacted components to obtain surface-modified zirconia nanoparticles.

In IR analysis of the surface-modified zirconia nanoparticles, a decrease in the peak around 1690 $cm^{-1}$ derived from the carboxylic acid and the onset of each of the peaks appeared at 1550 $cm^{-1}$ and 1450 $cm^{-1}$ and the peak appeared at 1100 $cm^{-1}$ derived from Zr—O—C— confirmed that zirconia nanoparticles were surface-modified by p-toluic acid.

The percentages of modification WF and M were calculated using a thermogravimetric and differential thermal analyzer (TG-DTA, TG8120 available from Rigaku Corporation). The percentage of modification was 18% by mass. In addition, dynamic light scattering (DLS, available from Malvern, Zetasaizer Nano ZS) of the surface-modified zirconia nanoparticles indicated that the surface-modified zirconia nanoparticles aggregated in toluene to about the senary particle size (average particle size: 3 nm).

(Optical Properties of Hybrid Film)

A certain amount of the surface-modified zirconia nanoparticles obtained above was added to toluene and dispersed with a homogenizer for about five minutes to obtain a dispersion of zirconia nanoparticles in toluene. The carboxyl group-containing methyl-substituted PPS (30 mg/mL) obtained in Example 2 was added to and mixed with the dispersion at the compounding ratios shown in Table 4. The resulting solution mixture (sulfur-containing polymer composition) was drop-cast onto a glass substrate to form a 3-μm thick film as a hybrid film. The hybrid film was subjected to spectroscopic ellipsometry measurement and UV-vis measurement, which showed that good optical properties ($n_D$=1 73, $v_D$=23, % T=84%) were achieved with a $ZrO_2$ content of 16.4% ($ZrO_2$/1).

Comparative Example 2

A dispersion was prepared as in Example 3, except that the methyl-substituted PPS of Comparative Example 1 was used instead of the carboxyl group-containing methyl-substituted PPS. This dispersion was used to form a hybrid film.

Table 4 shows the various physical property values of the hybrid films obtained in Example 3 and Comparative Example 2. In Experimental Examples 3-1 to 3-4 in Table 4, the hybrid film of Example 3 was used, and in Experimental Example 3-5 in Table 4, the hybrid film of Comparative Example 2 was used.

TABLE 4

| Experimental Example | Polymer | Dispersibility | Compounding ratio (mass ratio) Modified $ZrO_2$/ Polymer | $ZrO_2$ /Polymer (%) | $n_D$ | $n_D$ (calculated value) | $\nu_D$ | Film thickness (μm) | Transmittance (%) (400 nm) |
|---|---|---|---|---|---|---|---|---|---|
| 3-1 | 2 | — | — | — | 1.70 | 1.70 | 24 | 3.1 | 88 |
| 3-2 | 2 | Good | 1.5/15 | 8.2 | 1.71 | 1.71 | 22 | 2.9 | 88 |
| 3-3 | 2 | Good | 2.7/15 | 14.8 | 1.72 | 1.72 | 23 | 3.0 | 87 |
| 3-4 | 2 | Good | 3.8/15 | 16.4 | 1.73 | 1.72 | 23 | 3.1 | 84 |
| 3-5 | 1 | Poor | 1.5/15 | 8.2 | — | — | — | 2.8 | — |

In Table 4, Polymer 2 indicates carboxyl group-containing methyl-substituted PPS (Mw=$2.8\times10^4$, acrylic acid monomer unit/(MePPS unit+acrylic acid monomer unit)=0.18), and Polymer 1 indicates methyl-substituted PPS.

In the evaluation of dispersibility, "Good" refers to "dispersed" and "Poor" refers to "cloudy".

The refractive index ($n_D$) (calculated value) was calculated by Lorenz-Lorenz effective medium theory ($n_{D\ ZrO2}$=2.13, $n_{D\ polymer}$=1.70, $n_{D\ modifer}$=1.52, $\rho_{ZrO2}$=5.68 g/cm$^3$, $\rho_{polymer}$=1.28 g/cm$^3$, $\rho_{modifer}$=1.06 g/cm$^3$).

The film thickness was determined by measurement of a sample having an uneven shape prepared by cutting off a part of the surface thereof, using a stylus profilometer (available from KLA Tencor, P-6).

Figure 4:
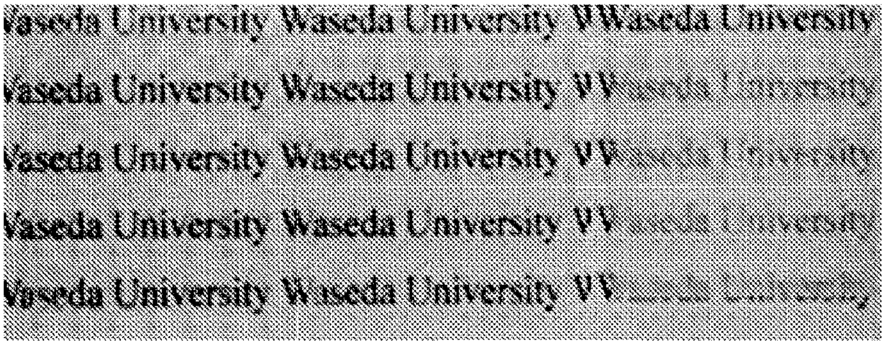
FIG. 4 shows photographs of hybrid films obtained in Experimental Examples 3-1, 3-4, and 3-5.

FIG. 4 shows photographs of the hybrid films obtained in Experimental Examples 3-1, 3-4, and 3-5.

Table 4 demonstrated that a thin film prepared from a dispersion containing carboxyl group-containing methyl-substituted PPS and surface-modified zirconia nanoparticles had excellent dispersibility, a high refractive index, and excellent transparency.

Example 4

<Sulfur-Containing Polymer 3>

(Synthesis of Monomer)

A 1000-mL conical beaker was charged with chloroform (300 mL), m-toluenethiol (24.8 g, 0.2 mol), and a solution of iodine (25.4 g, 0.1 mol) in methanol (300 mL), followed by stirring for an hour at room temperature. Then, an aqueous solution of sodium thiosulfate was added thereto to remove iodine, and the solvent was distilled off. The reaction solution was dispersed in diethyl ether, and the dispersion was subjected to liquid-liquid extraction by washing first with an aqueous hydrochloric acid solution (3% by mass), then with an aqueous sodium hydroxide solution (5% by mass), and finally with pure water. The washed solution was dehydrated, subjected to removal of the solvent, and dried in a vacuum to obtain bis(3-methylphenyl) disulfide. The yield was 80%. The structure was confirmed by $^1$H-NMR, $^{13}$C-NMR, or FAB-MS. [Bis(3-methylphenyl) disulfide]

$^1$H-NMR ($CD_2Cl_2$, 500 MHz, ppm): δ=7.30 (s, 2H, Ph-H), 7.28 (d, 2H, Ph-H), 7.16 (t, 2H, Ph-H), 7.01 (d, 2H, Ph-H), 2.78 (s, 6H, methyl-H)

$^{13}$C-NMR ($CD_2Cl_2$, ppm): δ=139.5, 137.1, 129.2, 128.4, 128.3, 124.9, 21.4

Mass: m/z 245.7 (found), 246.4 (calcd).

[Chem. 14]

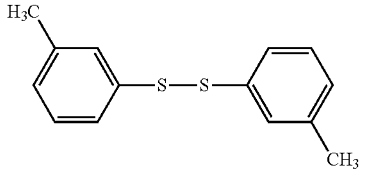

(Synthesis of Polymer)

In a 50-mL three-necked flask, diphenyl disulfide (3.64 g, 16.67 mmol) and bis(3-(methylphenyl) disulfide (0.821 g, 3.33 mmol) obtained in the above-described (Synthesis of monomer) were added to a solution (20 mL) of 2,3-dichloro-5,6-dicyano-p-benzoquinone (DDQ, 1 M) and trifluoroacetic acid (1 M) in dichloromethane, followed by oxidative polymerization under stirring at room temperature for 20 hours. By-products were removed from the polymerization solution with a glass filter, the polymerization solution was added dropwise to methanol acidified with hydrochloric acid to produce and precipitate the polymer, and the precipitates were separated by filtration through a glass filter and collected as powder. Thereafter, the powder was first washed with an aqueous potassium hydroxide solution (0.1 M), then with pure water, and finally with methanol, and dried in a vacuum. Thus, a polymer A containing a repeating unit represented by the following formula (A) was obtained.

The polymer A was identified by $^1$H-NMR and $^{13}$C-NMR. The polymer A had a weight average molecular weight Mw of 2700, a Mn of 1300, a glass transition temperature of 73° C., and a refractive index of 1.79. In XPS analysis of the polymer A, the element content ratio (O/S) of the oxygen atoms attached to the sulfur atoms in the main chain of the polymer A to the sulfur atoms in the main chain was 0.04 (0.04/1). The bond energy of sulfur atom was 162 to 164 eV. This indicated that 100% of S was in the form of sulfide. The yield of the polymer A was 72%. The letter x in the formula (A) was 0.833.

(Polymer A)

$^1$H-NMR ($CD_2Cl_2$, 500 MHz, ppm): δ=7.23 (m, 23H, Ph-H), 2.25 (s, 3H, methyl-H)

$^{13}$C-NMR ($CD_2Cl_2$, ppm): δ=141.2, 136.5, 134.1, 131.1, 127.9, 127.4, 20.7

[Chem. 15]

(A)

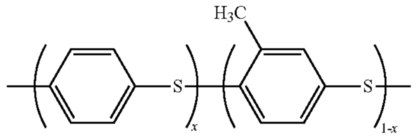

(Synthesis of Thiol-Terminated PPS)

The polymer A in an amount of 8.92 g was dissolved in tetrahydrofuran (THF, 79.3 mL), 0.6 g of sodium borohydride was added thereto, and 16 mL of methanol was added dropwise thereto with stirring, followed by stirring at 25° C. for 18 hours. After completion of the reaction, the solution was subjected to purification by precipitation in methanol acidified with hydrochloric acid (1600 mL, containing 5 vol % hydrochloric acid), and the precipitates were separated by filtration through a glass filter, and washed with methanol and water. The resulting substance was dried in a vacuum overnight (25° C., 12 hours) to obtain a thiol-terminated methyl-substituted polyphenyl sulfide resin (SH-MePPS) (yield 68%, terminal thiol concentration 100%).

(Synthesis of Phosphate-Terminated Methyl-Substituted PPS (P-MePPS))

The SH-MePPS obtained above in an amount of 6.1 g (monomer unit 53.9 mmol) was dissolved in 53.9 mL of THF, 0.82 g (21.6 mmol) of sodium borohydride and 19 g (10.7 mmol) of 2-acryloyloxyethyl phosphate were added thereto, and 1.6 mL of methanol was added dropwise thereto with stirring, followed by stirring at 25° C. for 18 hours. After completion of the reaction, the solution was subjected to purification by precipitation in methanol acidified with hydrochloric acid (1100 mL, containing 5 vol % hydrochloric acid), the precipitates were separated by filtration through a glass filter, washed with methanol and water, and dried in a vacuum overnight (25° C., 12 hours). Thus, 5.7 g of phosphate-terminated methyl-substituted PPS (P-MePPS) was obtained (yield 94%, one phosphate group was introduced per 19.2 monomer units as a terminal phosphate). In NMR and GPC analyses of the polymer, the percentage of phosphoric acid that replaced the thiol groups was 60%.

(Synthesis of Phosphate-Terminated Methyl-Substituted Oxidized PPS (P-MePPSO))

The P-MePPS obtained above (5.7 g, 50.7 mmol) was added to 203 mL of a solution of m-chloroperbenzoic acid (mCPBA, 0.25 M) in chloroform, and was oxidized under stirring at room temperature for 20 hours. Then, the reaction solution was added dropwise to methanol acidified with hydrochloric acid, followed by centrifugation of the mixture and drying of the resulting product in a vacuum to obtain a polymer P-MePPSO (sulfur-containing polymer 3). The yield of the polymer was 95%. The structure of the polymer was identified by $^1$H-NMR, IR, and XPS. The element content ratio (O/S) of the oxygen atoms attached to the sulfur atoms in the main chain to the sulfur atoms in the main chain was 1.

(Preparation of Phosphate-Terminated Methyl-Substituted Oxidized PPS (P-MePPSO) and $ZrO_2$ Particle Composite Composition)

P-MePPSO was dissolved in 1,1,1,3,3,3-hexafluoro-2-propanol (HFIP) to prepare a solution having a concentration of P-MePPSO of 5% by mass (solute mass/solution mass). Separately, P-MePPSO and a zirconia ($ZrO_2$) nanoparticle-dispersed methyl ethyl ketone solution (Nippon Shokubai Co., Ltd., ZP-153, solid content 70% by mass) were dissolved in HFIP to prepare a solution in which the solid content of each of these was 2.5% by mass (solute mass/solution mass).

Each solution was applied to a slide glass with a spin coater (500 rpm×60 s, film thickness about 1 μm), dried by heating at 260° C. for 10 minutes to form a film. The transmittance of each film was evaluated. Separately, each solution was diluted 10 times with HFIP, and the dilution was applied to a silicon wafer with a spin coater (1000 rpm×60 s, film thickness 10 to 900 nm), and dried by heating at 260° C. for 10 minutes to form a film. The refractive index of each film was evaluated. Table 5 shows the results.

Comparative Example 3

A zirconia nanoparticle dispersion was prepared and formed into a film as in Example 4, except that a polymer A-1 obtained by oxidizing the main chain of the polymer A was used instead of P-MePPSO. The transmittance and refractive index of the film were evaluated. Table 5 shows the results. The following describes a method for preparing the polymer A-1.

(Preparation of Polymer A-1)

In a 50-mL recovery flask, the polymer A (0.302 g) obtained above was added to 10 mL of a solution of m-chloroperbenzoic acid (mCPBA, 0.25 M) in chloroform and was oxidized under stirring at room temperature for 20 hours. Then, the reaction solution was added dropwise to methanol acidified with hydrochloric acid, followed by centrifugation of the mixture and drying of the resulting product in a vacuum to obtain the polymer A-1 containing a repeating unit represented by the following formula (A-1). The yield of the polymer A-1 was 97%. The structure of the polymer was identified by $^1$H-NMR, IR, and XPS. The element content ratio (O/S) of the oxygen atoms attached to the sulfur atoms in the main chain of the polymer to the sulfur atoms in the main chain was 0.92 (0.92/1). As for the binding energy of sulfur atom, peaks appeared at 165 eV and 163 eV, the peak at 165 eV was resolved into the peaks in the range of 164 to 168 eV (sulfoxide) and the peak at 163 eV was resolved into the peaks in the range of 162 to 168 eV (sulfide). The ratio of the peak area of sulfoxide to the peak area of sulfide was 47.8:4.4.

In the formula (A-1), x was 0.08 and y was 0.92.

(Polymer A-1)

$^1$H-NMR ($CD_2Cl_2$, 500 MHz, ppm): δ=7.55 (m, 23H, Ph-H), 2.34 (s, 3H, methyl-H)

IR ($cm^{-1}$): 1045 (νS=O)

[Chem. 16]

(A-1)

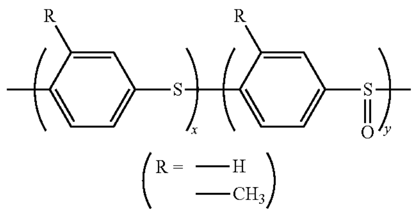

TABLE 5

| | Transmittance (%) (400 nm) | Refractive index (589 nm) |
|---|---|---|
| P—MePPSO | 87.1 | 1.71 |
| P—MePPSO + $ZrO_2$ | 88.0 | 1.75 |
| Polymer A-1 | 87.6 | 1.73 |
| Polymer A-1 + $ZrO_2$ | 52.3 | — |

Table 5 shows that P-MePPSO has a high refractive index of 1.7 or higher and a high transmittance of 87% or higher. Table 5 also shows that a composition of P-MePPSO and $ZrO_2$ has a higher transmittance and a higher refractive index than P-MePPSO alone. Such a composition was found to prevent aggregation of $ZrO_2$ even at a high temperature of 260° C., and provided a highly heat-resistant, highly refractive, transparent material applicable to polymer injection molding. On the other hand, a composition of the polymer A-1 of Comparative Example 3 and $ZrO_2$ had a reduced transmittance.

Example 5

<Sulfur-Containing Polymer 4>

(Synthesis of Thiol-Terminated PPS-2)

The polymer A used in Example 4 in an amount of 20 g (0.18 mol) was dissolved in tetrahydrofuran (THF, 200 mL), and 4.8 g of triphenylphosphine was added thereto, followed by stirring at 35° C. for 18 hours. After completion of the reaction, the resulting solution was subjected to purification by precipitation in methanol acidified with hydrochloric acid (2000 mL, containing 5 vol % hydrochloric acid), and the precipitates were separated by filtration through a glass filter, and washed with methanol and water. The resulting substance was dried in a vacuum overnight (25° C., 12 hours) to obtain a thiol-terminated methyl-substituted polyphenyl sulfide resin (SH-MePPS-2) (yield 91%, terminal thiol concentration 100%).

(Synthesis of Carboxyl-Terminated Methyl-Substituted PPS (COOH-MePPS))

The SH-MePPS-2 in an amount of 1 g was dissolved in 10 mL of THF and 0.5 mL of water, then 0.28 g of 2-carboxyethyl acrylate and 0.76 g of potassium carbonate were added thereto, followed by stirring at 25° C. for 18 hours. After completion of the reaction, the solution was subjected to purification by precipitation in methanol acidified with hydrochloric acid (100 mL, containing 5 vol % hydrochloric acid), the precipitates were separated by filtration through a glass filter, washed with methanol and water, and dried in a vacuum overnight (25° C., 12 hours). Thus, 0.8 g of carboxyl-terminated methyl-substituted PPS (COOH-MePPS) was obtained (yield: 81%, one carboxylic acid group was introduced per 22.3 monomer units as a terminal carboxylic acid). In $^1H$-NMR and GPC analyses of the resulting polymer, the percentage of carboxylic acid that replaced the thiol groups was 52%.

(Synthesis of Carboxyl-Terminated Methyl-Substituted Oxidized PPS (COOH-MePPSO))

The COOH-MePPS (0.8 g) obtained above was added to 28.5 mL of a solution of m-chloroperbenzoic acid (mCPBA, 0.25 M) in chloroform, and was oxidized under stirring at 25° C. for 20 hours. Then, the reaction solution was added dropwise to methanol acidified with hydrochloric acid, followed by centrifugation of the mixture and drying of the resulting product in a vacuum to obtain a polymer COOH-MePPSO (sulfur-containing polymer 4). The yield of the polymer was 85%. The structure of the polymer was identified by $^1H$-NMR, IR, and XPS. The element content ratio (O/S) of the oxygen atoms attached to the sulfur atoms in the main chain of the polymer to the sulfur atoms in the main chain was 0.97.

(Preparation of Carboxyl Group-Terminated Methyl-Substituted Oxidized PPS (COOH-MePPSO) and $ZrO_2$ Particle Composite Composition)

The COOH-MePPSO and a zirconia nanoparticle-dispersed methyl ethyl ketone solution (Nippon Shokubai Co., Ltd., ZP-153, solid content 70% by mass) were dissolved in HFIP to prepare a composite composition (sulfur-containing polymer composition) in which the solid content of each of these was 2.5% by mass (solute mass/solution mass).

The COOH-MePPSO was dissolved in 1,1,1,3,3,3-hexafluoro-2-propanol (HFIP) to prepare a composition in which the percentage of COOH-MePPSO was 5% by mass (solute mass/solution mass).

Each composition was applied to a slide glass with a spin coater (500 rpm×60 s, film thickness of about 1 μm), and dried by heating at 260° C. for 10 minutes to form a film. The transmittance of each film was evaluated.

Separately, each composition was diluted 10 times with HFIP, and the dilution was applied to a silicon wafer with a spin coater (1000 rpm×60 s, film thickness 10 to 900 nm), and dried by heating at 260° C. for 10 minutes to form a film. The refractive index of the film was evaluated.

The polymer A-1 of Comparative Example 3 was compared with the composite composition of the polymer A-1 and the zirconia nanoparticle dispersion. Table 6 shows the results.

TABLE 6

| | Transmittance (%) (400 nm) | Refractive index (589 nm) |
|---|---|---|
| COOH—MePPSO | 86.7 | 1.71 |
| COOH—MePPSO + $ZrO_2$ | 87.9 | 1.74 |
| Polymer A-1 | 87.6 | 1.73 |
| Polymer A-1 + $ZrO_2$ | 52.3 | — |

Table 6 shows that the carboxyl group-terminated methyl-substituted oxidized PPS has a high refractive index of 1.7 or higher and a high transmittance of 86% or higher. Table 6 also shows that the composition of the carboxyl group-terminated methyl-substituted oxidized PPS and $ZrO_2$ has a higher transmittance and a higher refractive index than the carboxyl group-terminated methyl-substituted oxidized PPS alone. Such a composition was found to prevent aggregation of $ZrO_2$ even at a high temperature of 260° C., and provided a highly heat-resistant, highly refractive, transparent material applicable to polymer injection molding.

Example 6

<Sulfur-Containing Polymer 5>

(Synthesis of Vinyl-Terminated Methyl-Substituted PPS (V-MePPS))

The SH-MePPS-2 in an amount of 1 g was dissolved in 20 mL of THF and 1 mL of water, then 0.34 g of VEEA® (Nippon Shokubai Co., Ltd., CAS86273-46-3) and 0.76 g of potassium carbonate were added thereto, followed by stirring at 25° C. for 18 hours. After completion of the reaction, the solution was subjected to purification by precipitation in methanol acidified with hydrochloric acid (200 mL, containing 5 vol % hydrochloric acid). The precipitates were separated by filtration through a glass filter, washed with methanol and water, and dried in a vacuum overnight (25° C., 12 hours). Thus, 0.9 g of vinyl-terminated methyl-substituted PPS (V-MePPS) (sulfur-containing polymer 5) was obtained (yield 94%, one vinyl group was introduced per 55.2 monomer units as a terminal vinyl group). In NMR and GPC analyses of the resulting polymer, the percentage of a vinyl group that replaced the thiol groups was 21%. The refractive index ($n_D$) was 1.73.

Example 7

<Sulfur-Containing Polymer 6>

(Synthesis of Bromo-Containing Polymer B)

Poly(2,6-dimethyl-1,4-phenylenesulfide) (PMPS) was synthesized as in (Synthesis of OMePPS) in Example 1, except that 2,6-dimethylthiophenol was used instead of 2-methoxybenzenethiol and bis(2,6-methylphenyl) disulfide was used instead of bis(2-methoxyphenyl) disulfide.

In a 300-mL three-necked flask, the PMPS (2.7242 g, repeating unit 20 mmol, 20 mmol) was dissolved in chlorobenzene (100 mL).

Subsequently, N-bromosuccinimide (NBS, 3.5998 g, 20 mmol, 1 eq. for PMPS) and 2,2-azoisobutyronitrile (AIBN, 98.526 mg, 0.6 mmol, 0.03 eq. for PMPS) were added thereto, and nitrogen was passed through (nitrogen bubbling) the contents at room temperature for 30 minutes. Thereafter, the temperature was raised to 80° C. and the contents were refluxed under a nitrogen atmosphere for five hours. After completion of the reaction, the reaction solution was cooled in an ice bath, so that precipitates derived from NBS were formed. The precipitates were removed by filtration. Subsequently, the collected filtrate was concentrated using an evaporator, and then the concentrates were added dropwise to methanol acidified with hydrochloric acid (MeOH 800 mL/HCl aq. 5 vol %) for purification by precipitation. The precipitates were collected by centrifugation and dried under reduced pressure. Thus, a polymer B was obtained as pale-yellow powder (yield: 89%).

(Oxidation Reaction of Polymer Main Chain)

In a 50-mL flask, the polymer B (0.98481 g, 5.0 mmol, 0.25 M) was dissolved in chloroform (20 mL). Subsequently, 1 equivalent of m-chloroperbenzoic acid (mCPBA) was added thereto and the reaction was performed at room temperature in the air for 20 hours. After completion of the reaction, chloroform was added to the reaction solution, and the resulting precipitates were dispersed. The dispersion was added dropwise to methanol acidified with hydrochloric acid (MeOH 600 mL/HCl aq. 5 vol %) for purification by precipitation. The precipitates were collected by centrifugation and dried under reduced pressure. Thus, a polymer B-1 was obtained as white powder (yield: 77%, which was calculated based on the reaction rate of mCPBA taken as 100%).

(Synthesis of Hydroxy Group-Containing Polymer B-1-1)

In a 50-mL flask, the polymer B-1 (0.42003 g, 2.0 mmol, 0.2 M) was dissolved in N-methyl-2-pyrrolidone (M4P, 10 mL). Subsequently, $H_2O$ (1 mL, 10 vol % for NMP) was added thereto and the solution was heated under reflux at 100° C. for 90 hours. After completion of the reaction, the reaction solution was added dropwise to methanol acidified with hydrochloric acid (MeOH 500 mL/HCl aq. 5 vol %) for purification by precipitation. The precipitates were collected by centrifugation and dried under reduced pressure. Thus, a polymer B-1-1 (sulfur-containing polymer 6) was obtained as pale-brown to grayish white powder (yield: 78%, which was calculated assuming that 100% of the bromo groups had been replaced by hydroxy groups).

The amounts of SO and $SO_2$ in each polymer were determined by IR, and the amounts of OH, Br, and $CH_3$ in each polymer were determined by $^1$H-NMR.

The glass transition temperature (Tg), the refractive index ($n_D$) at the Fraunhofer D line (589.3 nm), and the Abbe number ($v_D$) of each polymer were evaluated by the above-described methods. Table 7 shows the results.

TABLE 7

| | Main chain | | Side chain | | | Tg | | |
|---|---|---|---|---|---|---|---|---|
| | % (SO) | % ($SO_2$) | % (OH) | % (Br) | % ($CH_3$) | (° C.) | $n_D$ | $v_D$ |
| PMPS | 0 | 0 | 0 | 0 | 200 | 150 | 1.69 | 21 |
| Polymer B | 0 | 0 | 0 | 78 | 122 | 172 | 1.72 | 20 |
| Polymer B-1 | 49 | 20 | 0 | 78 | 122 | _Note) | 1.68 | 20 |
| Polymer B-1-1 | 49 | 20 | 73 | 5 | 122 | _Note) | 1.67 | 24 |

Note)
The decomposition temperature was unclear.

Experimental Examples 8-1 to 8-4

(Hybridization of Hydroxy Group-Containing Polymer B-1-1 with $TiO_2$)

In a 10-mL sample vessel, the polymer B-1-1 (20 mg, 0.03 M) was dissolved in dimethylacetamide (DMAc, 4 mL), and hydrochloric acid ([HCl]/[Ti]=2) was added thereto, and the solution was stirred for 30 minutes. Subsequently, a solution of tetrabutyl orthotitanate in butanol (1.47 M Ti solution) was added according to the formulation (by mass) shown in Table 8 relative to the polymer B-1-1, and the solution was stirred for another 30 minutes to prepare a hybrid solution (sulfur-containing polymer composition).

The hybrid solution was applied to a glass substrate by drop casting or to a silicon wafer by spin coating to prepare films each having a thickness described in Table 8. Each film was dried by heating under reduced pressure for two hours at 60° C. and for an hour at 150° C. to form a hybrid film. The hybrid film was subjected to evaluation of absorbance at a wavelength of 400 nm, refractive index ($n_D$) at the Fraunhofer D line (589.3 nm), and Abbe number ($v_D$) by the above-described methods. Table 8 shows the results.

Figure 5:
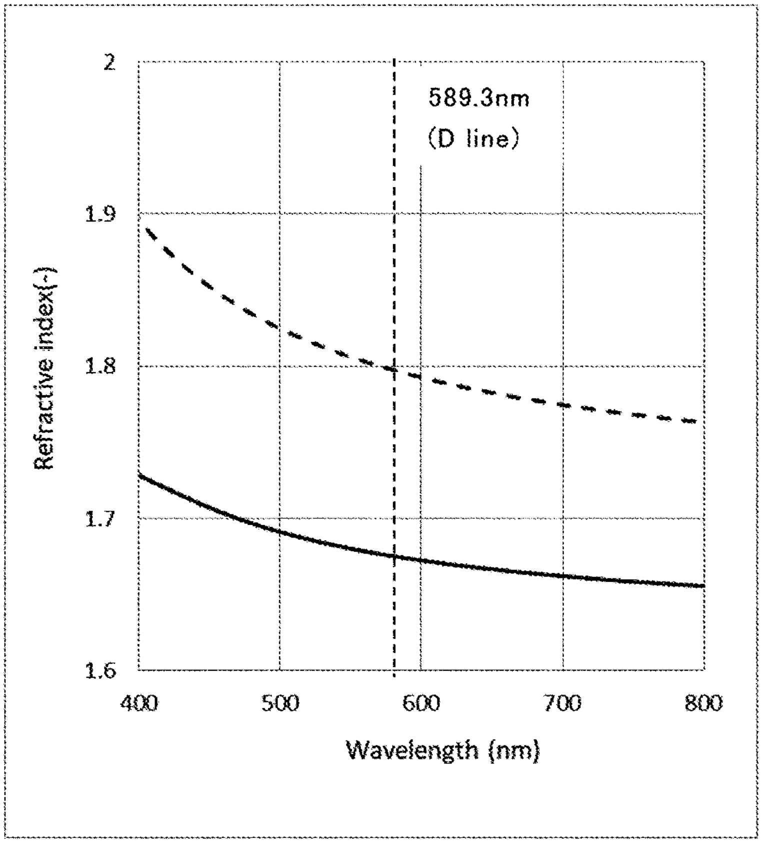
FIG. 5 is a graph showing measurement data of the refractive indices of hybrid solutions of Experimental Examples 8-1 and 8-4 in Example 7.

FIG. 5 is a diagram showing measurement data of the refractive indexes of the sulfur-containing polymer compositions of Experimental Examples 8-1 and 8-4 in Example 7. In the figure, the solid line indicates Experimental Example 8-1 and the broken line indicates Experimental Example 8-4.

Figure 6:
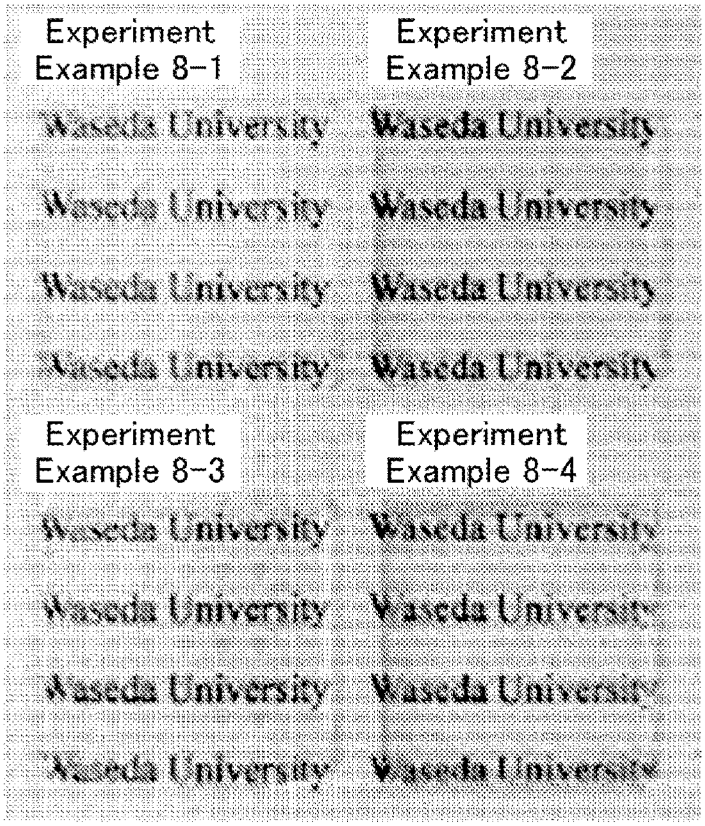
FIG. 6 shows photographs of hybrid films obtained in Experimental Examples 8-1 to 8-4 in Example 7.

FIG. 6 shows a photograph of the hybrid films obtained in Experimental Examples 8-1 to 8-4 in Example 7.

TABLE 8

| Experimental Example | $TiO_2$ (mass %) Addition amount | Film thickness (μm) | Absorbance/Thickness (400 nm) ($\times 10^2$ $\mu m^{-1}$) | $n_D$ | $v_D$ |
|---|---|---|---|---|---|
| 8-1 | — | 5 | 0.8 | 1.67 | 24 |
| 8-2 | 10 | 3 | 1.4 | 1.73 | 24 |

TABLE 8-continued

| Experimental Example | $TiO_2$ (mass %) Addition amount | Film thickness (μm) | Absorbance/ Thickness (400 nm) ($\times 10^2$ $\mu m^{-1}$) | $n_D$ | $v_D$ |
|---|---|---|---|---|---|
| 8-3 | 20 | 1 | 2.7 | 1.77 | 19 |
| 8-4 | 30 | 0.9 | 4.6 | 1.80 | 16 |

Table 8 shows that the sulfur-containing polymer compositions containing the sulfur-containing polymers of the examples and metal oxide have a high refractive index and high transparency.

Example 8

<Sulfur-Containing Polymer 7>

(Synthesis of Bromo-Substituted PPS)

In a 100-mL two-necked flask, poly(2,6-dimethyl-1,4-phenylene sulfide) (PMPS) (1.5 g, repeating unit 11.0 mmol, 1 eq.) was dissolved in chlorobenzene (55 mL). Thereafter, N-bromosuccinimide (NBS) (0.55 eq or 0.28 eq.) and AIBN (0.016 eq or 0.008 eq.) were added thereto, and the mixture was heated under reflux at 135° C. for four hours. After completion of the reaction, the precipitated succinimide was removed by filtration, and the filtrate was subjected to purification by precipitation in methanol acidified with hydrochloric acid (1000 mL, containing 5 vol % hydrochloric acid). The precipitates were separated by filtration through a glass filter, washed with methanol and water, and dried in a vacuum to obtain bromo-substituted PPS.

(Synthesis of Vinyl-Substituted PPS)

In a 100-mL flask, bromo-substituted PPS (0.5 g, 1 eq.) having certain introduction ratios was dissolved in THF in such an amount that the polymer concentration was 0.1 M, and triphenylphosphine (4 eq. for benzyl bromide) was added thereto. The mixture was heated under reflux at 70° C. for 24 hours. After completion of the reaction, the solution was cooled, a 37% by mass formaldehyde aqueous solution (32 eq. for benzyl bromide) was added thereto, and the mixture was stirred for 10 minutes. Subsequently, potassium t-butoxide (4.2 eq. for benzyl bromide) was added thereto, and the mixture was reacted at room temperature for an hour. After completion of the reaction, the reaction solution was subjected to purification by precipitation in methanol acidified with hydrochloric acid (500 mL, containing 5 vol % hydrochloric acid). The precipitates were washed with methanol and water, and dried in a vacuum to obtain a vinyl-substituted PPS (sulfur-containing polymer 7). A synthesis reaction formula for the vinyl-substituted PPS is shown below.

[Chem. 17]

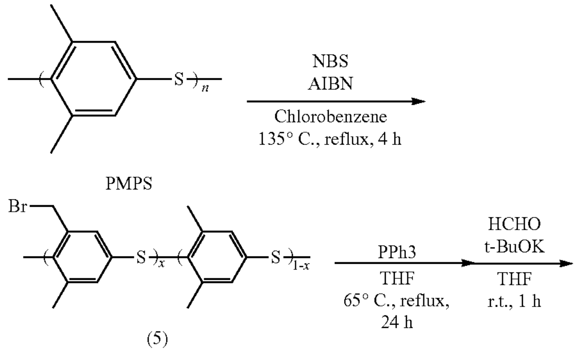

(5)

-continued

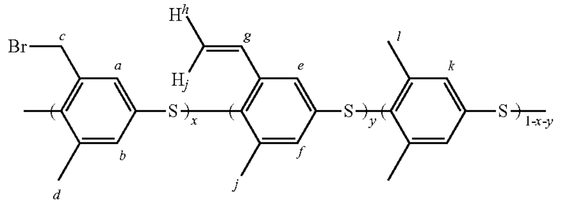

(6)

Table 9 shows the introduction ratios (x, y) of structural units in each obtained polymer and the glass transition temperature (Tg) of the polymer. In Table 9, Polymer 5 refers to a polymer (5) in the above reaction formula, and Polymer 6 refers to a polymer (6) in the above reaction formula. The introduction ratios x and y are the values of x and y in the polymer (6) in the above reaction formula.

Table 10 shows the results of $^1$H-NMR analysis and the molecular weights of Polymer 6 produced.

TABLE 9

| | Polymer | [NBS]/ [S] | Yield of PMPS (%) | Introduction ratios x | y | Tg (° C.) |
|---|---|---|---|---|---|---|
| — | PMPS | — | — | — | — | 160 |
| 9-1 | 5 | 0.55 | 69 | 0.44 | — | 169 |
| 9-2 | 6 | — | 53 | 0.01 | 0.43 | 201 |
| 9-3 | 5 | 0.28 | 80 | 0.21 | — | 166 |
| 9-4 | 6 | — | 72 | 0.01 | 0.2 | 187 |

TABLE 10

| $^1$H-NMR (δ: ppm) | Mn ($\times 10^3$) | Mw ($\times 10^3$) | Mw/Mn |
|---|---|---|---|
| 7.23-7.19 (m, 1H, g),<br>7.07-6.24 (m, 2H, a, b, e, f, k),<br>5.42 (d, J = 17.6 Hz, 1H, i),<br>5.21-5.10 (m, 1H, h), 4.26 (s, 2H, c)<br>2.39-2.12 (m, 9H, d, j, l) | 6.0 | 15.9 | 2.7 |

In $^1$H-NMR analysis of the polymer (5) in the reaction formula, a peak derived from methylene was observed at 4.6 ppm. In $^1$H-NMR analysis of the polymer (6) in the reaction formula, the peak derived from the methylene group decreased and new peaks derived from the vinyl group appeared at 7.2, 5.4, and 5.2 ppm. Thereby, the structures were determined.

In IR analysis of the polymer (5), the absorption of the C—Br stretching vibration was observed at 1210 $cm^{-1}$. In IR analysis of the polymer (6), the intensity of the C—Br stretching vibration decreased and new absorption of the C—H out-of-plane bending vibration of the vinyl group was observed at 910 $cm^{-1}$. Thereby, the progress of the reaction was determined.

In DSC analysis of the polymers (5) and (6), the glass transition point was increased up to 201° C. through bromination and vinylation, respectively.

The sulfur-containing polymer produced had a refractive index of 1.7 or higher, a Tg of 200° C. or higher, and reactivity.

Example 9

<Sulfur-Containing Polymer 8>

(Synthesis of Bis(2,6-Dimethoxyphenyl) Disulfide)

In a 100-mL two-necked flask, magnesium (1.16 g, 48 mmol) was dispersed in THF (20 mL). Two drops of 1,2-dibromoethane were added thereto, the flask was purged with nitrogen, a solution of 1,3-dimethoxy-2-bromobenzene in THF (8.68 g, 40 mmol/10 mL) was added dropwise thereto, and the mixture was reacted under reflux for two hours. Subsequently, the solution was cooled to 0° C., sulfur (0.70 g, 22 mmol) was added thereto, and the contents were reacted at room temperature for another three hours. The solution was quenched with dilute hydrochloric acid (10 vol %, 50 mL) and subjected to extraction with chloroform (150 mL). The solvent was removed using an evaporator to give a crude product of 3,5-dimethoxybenzenethiol.

The crude product of 3,5-dimethoxybenzenethiol was dissolved in chloroform, an iodine-methanol solution (0.5 mM, 15 mL) was added dropwise thereto, and the contents were reacted for an hour. Unreacted iodine was reacted with an aqueous sodium thiosulfate solution (15% by mass), and the solvent was removed using an evaporator. The resulting substance was purified by liquid-liquid extraction (chloroform) and recrystallization (chloroform/methanol=1:10). Thus, bis(2,6-dimethoxyphenyl) disulfide (2,6-DMDPS) was obtained as a pale yellow solid (yield 63%).

The structure was determined by FAB-MS (338.44 (m/z)) and $^1$H-NMR (7.22 ppm (t, J=8.5 Hz, 2H), 6.50 ppm (d, J=9.0 Hz, 4H), 3.69 ppm (s, 12H, Me)), $^{13}$C-NMR (161.2 ppm, 130.9 ppm, 113.0 ppm, 103.8 ppm, 56.0 ppm). The melting point was 205° C. as determined by DSC. A synthesis reaction formula is shown below.

[Chem. 18]

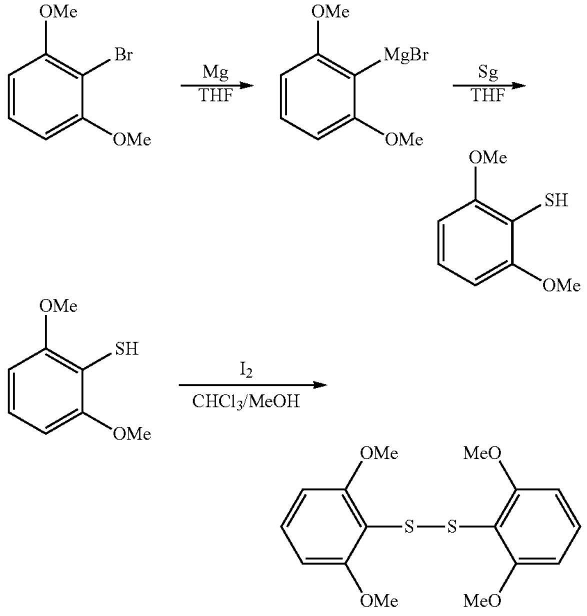

2,6-DMDPS
MW: 338.44

(Synthesis of Dimethoxy-Substituted PPS by Oxidation Polymerization)

In a 10-mL flask, the 2,6-DMDPS (0.17 g, 0.5 mmol) was dissolved in 1,2-dichloroethane (1 mL, DCE). Subsequently, trifluoroacetic acid (TFA) (7.5 μL, 0.1 M) and DDQ (0.11 g, 1 eq. of 2,6-DMDPS) as an oxidant were added thereto, and the contents were reacted at room temperature. After completion of the reaction, DCE (2 mL) was added to disperse the product, the dispersion was filtered through a glass filter. The filtrate was added dropwise to ethanol acidified with hydrochloric acid (5 vol %, 300 mL) for purification by precipitation, and the precipitates were collected with a glass filter. The collected substance was washed with an aqueous potassium hydroxide solution (5% by mass), pure water, and methanol, and dried under reduced pressure to give a dimethoxy-substituted PPS (sulfur-containing polymer 8) as white powder (yield 72%, Mn 3300, Mw 4100, Mw/Mn=1.2).

In IR analysis of the powder, the absorptions of the C—H out-of-plane bending vibration of a m-substituted (870 cm$^{-1}$) aromatic ring and of a p-substituted (910 cm$^{-1}$) aromatic ring were observed. The ratio of the substituted aromatic rings satisfies the relation (m-substituted aromatic ring):(p-substituted aromatic ring):(branched structure)=x:y:z=0.34:0.55:0.11 as determined by $^1$H-NMR analysis. The peaks determined by each of $^{13}$C-NMR and $^{13}$C-DEPT NMR correspond to the peaks determined by $^1$H-NMR.

The following shows the reaction formula of oxidative polymerization of 2,6-DMDPS and the chemical formula of the resulting dimethoxy-substituted PPS (P1).

[Chem. 19]

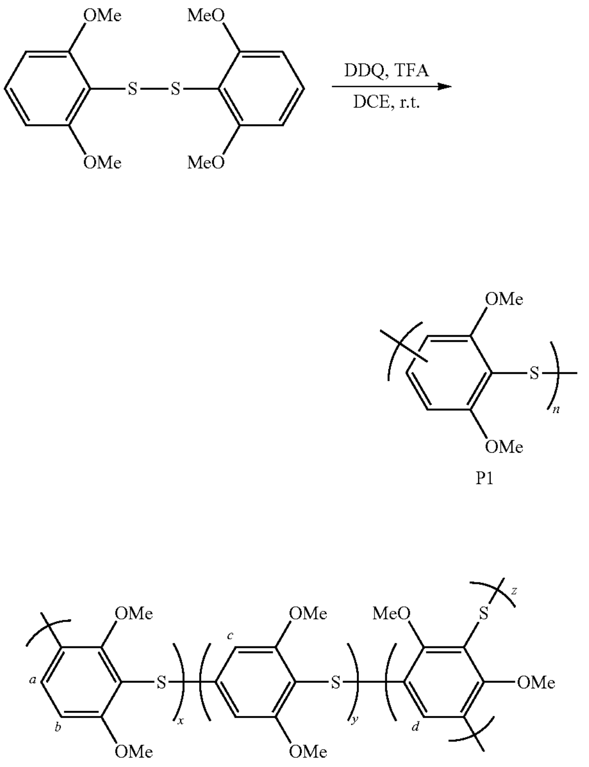

P1

In X-ray diffraction (XRD) profile analysis of the dimethoxy-substituted PPS (P1), no crystalline peak derived from PPS was observed, indicating amorphousness of the dimethoxy-substituted PPS (P1). The 5% weight loss temperature was 334° C. as determined by thermogravimetry (TGA), and the glass transition temperature was 116° C. as determined by DSC.

Dimethoxy-substituted PPS (P1) was dissolved in 1,1,2,2-tetrachloroethane to prepare a solution having a concentration of 30 mg/mL. The solution was drop-cast onto a glass substrate, and dried under reduced pressure at 40° C. for four hours to form a film. The film had a thickness of 5.2 μm, and a transmittance at 400 nm of 82%. A solution of dimethoxy-substituted PPS (P1) in DMF (concentration: 30 mg/mL) was applied to a silicon wafer by spin coating to form a film. The refractive index $n_D$ and Abbe number $v_D$ of the film were measured to be 1.74 and 16, respectively.

Figure 7:
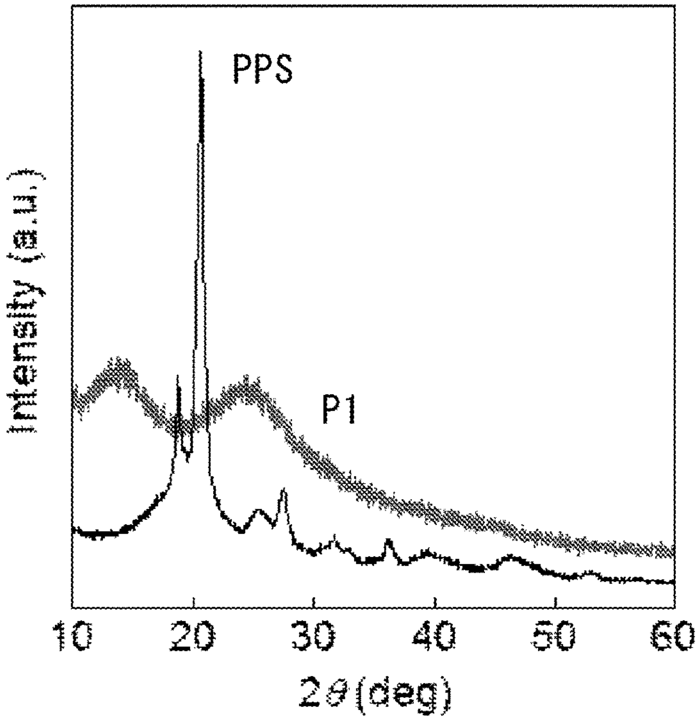
FIG. 7 is a graph showing XRD profiles of PPS and P1 of Example 9.

FIG. 7 shows the XRD profiles of the polyphenyl sulfide resin (PPS) and the dimethoxy-substituted PPS (P1) film.

Figure 8:
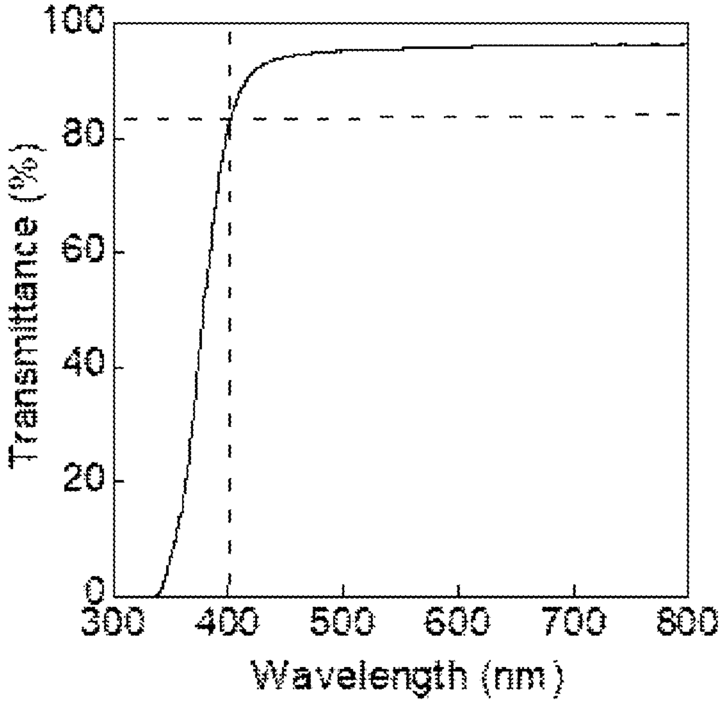
FIG. 8 is a graph showing measurement data of a transmittance of a P1 film of Example 9.
Figure 9:
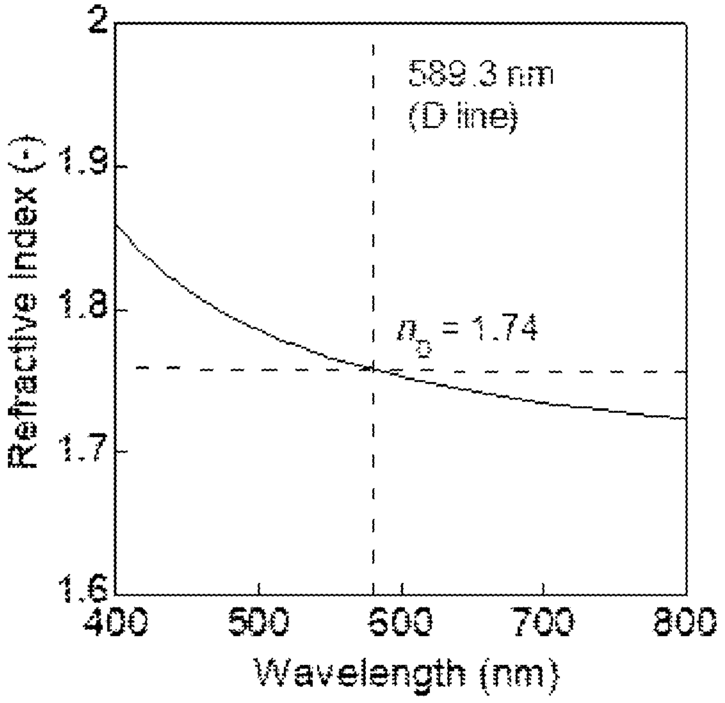
FIG. 9 is a graph showing measurement data of a refractive index of the P1 film of Example 9.

FIG. 8 shows the measurement data of the transmittance of the dimethoxy-substituted PPS (P1) film determined by UV-vis. FIG. 9 shows the measurement data of the refractive index of the dimethoxy-substituted PPS film (P1).

(Synthesis of Dihydroxy-Substituted PPS)

In a 50-mL flask, the dimethoxy-substituted PPS (P1) (0.2 g, 2.4 mmol of —OMe) was dissolved in dichloromethane (DCM) (10 mL) under an argon atmosphere in a glove box. The mixture was cooled to 0° C., a 1 M solution (6 mL) of boron tribromide in dichloromethane was added with a syringe, and the mixture was reacted at 0° C. for 30 minutes and at room temperature for 20 hours. The reaction solution was quenched with water and the solvent was removed using an evaporator. The resulting substance was redissolved in methanol, and the solution was subjected to purification by precipitation in water. The precipitates were collected with a glass filter and dried under reduced pressure to obtain a dihydroxy-substituted PPS (P2) (sulfur-containing polymer 8) (yield 77%). The reaction formula is shown below.

[Chem. 20]

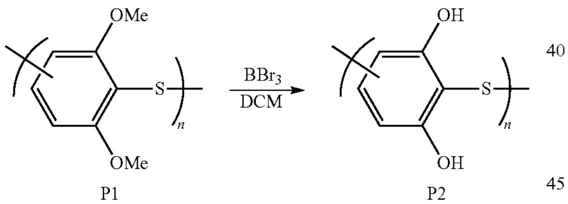

P1 P2

In $^1$H-NMR analysis of the dihydroxy-substituted PPS (P2), the introduction of hydroxy groups by demethylation was confirmed. The percentage of the introduction was 94%. In the $^1$H-NMR in methanol-d4, the peak of the hydroxy group disappeared, indicating that the polymer had proton exchange properties. In IR analysis of the dihydroxy-substituted PPS (P2), the absorption (3400 $cm^{-1}$) of the hydrogen-bonding O—H stretching vibration was observed, confirming the progress of the reaction.

In XRD analysis of the dihydroxy-substituted PPS (P2), no crystalline peaks derived from PPS were observed, indicating that the dihydroxy-substituted PPS (P2) remained amorphous even after demethylation. The glass transition temperature of the dihydroxy-substituted PPS (P2) was significantly improved to be 140° C., compared to that of the dimethoxy-substituted PPS (P1) owing to the introduction of hydrogen bonds.

Figure 10:
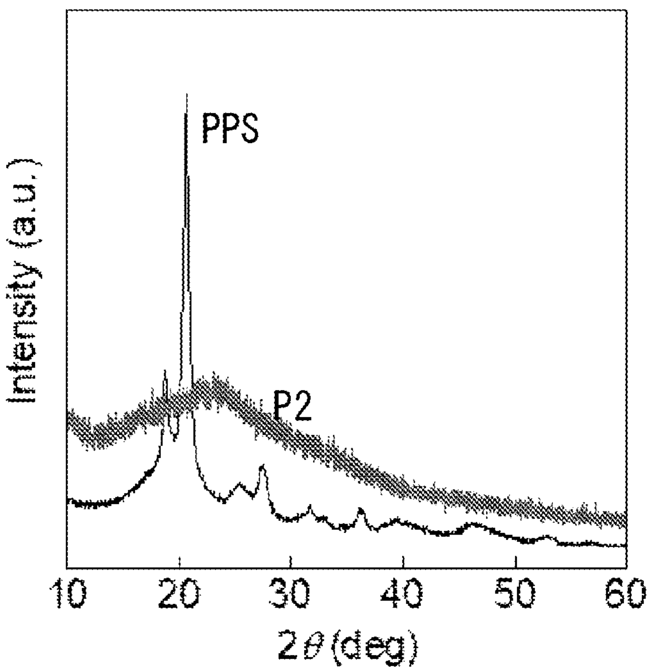
FIG. 10 is a graph showing XRD profiles of PPS and P2 of Example 9.
Figure 11:
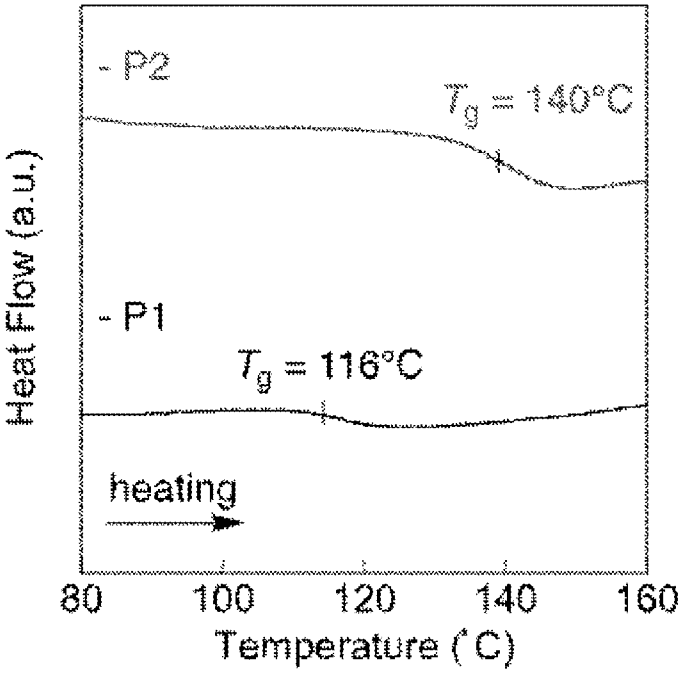
FIG. 11 is a graph showing DSC curves of P1 and P2.

FIG. 10 shows the XRD profiles of the polyphenyl sulfide resin (PPS) and the dihydroxy-substituted PPS (P2). FIG. 11 shows the DSC curves of the dimethoxy-substituted PPS (P1) and the dihydroxy-substituted PPS (P2). In other words, P1 is PPS before demethylation and P2 is PPS after demethylation.

The dihydroxy-substituted PPS (P2) was dissolved in DMF to prepare a solution having a concentration of 15 mg/mL. The solution was drop-cast onto a glass substrate, and dried under reduced pressure at 40° C. for four hours to form a film. The film had a thickness of 2.5 μm and a transmittance at 400 nm of 90%. A solution of dihydroxy-substituted PPS (P2) in DMF (concentration: 30 mg/mL) was applied to a silicon wafer by spin coating to form a film. The refractive index $n_D$ and Abbe number $v_D$ of the film were measured to be 1.85 and 16, respectively.

Figure 12:
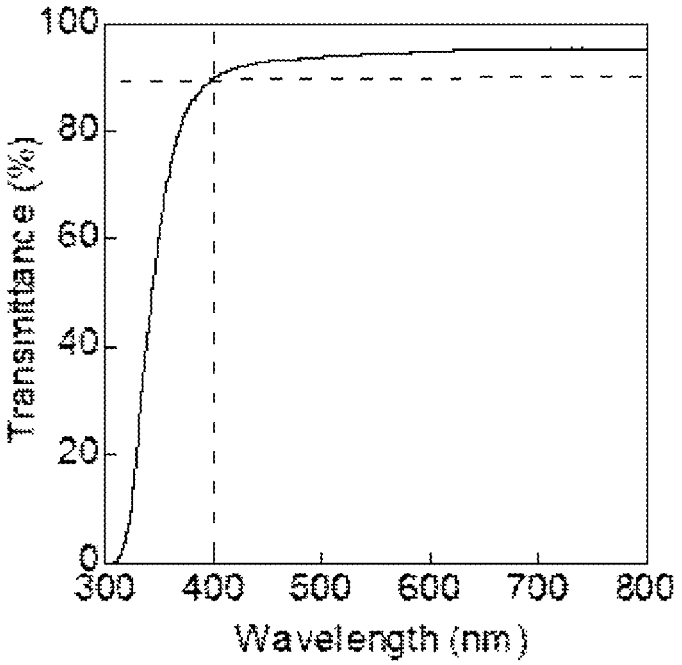
FIG. 12 is a graph showing measurement data of a transmittance of a P2 film of Example 9.
Figure 13:
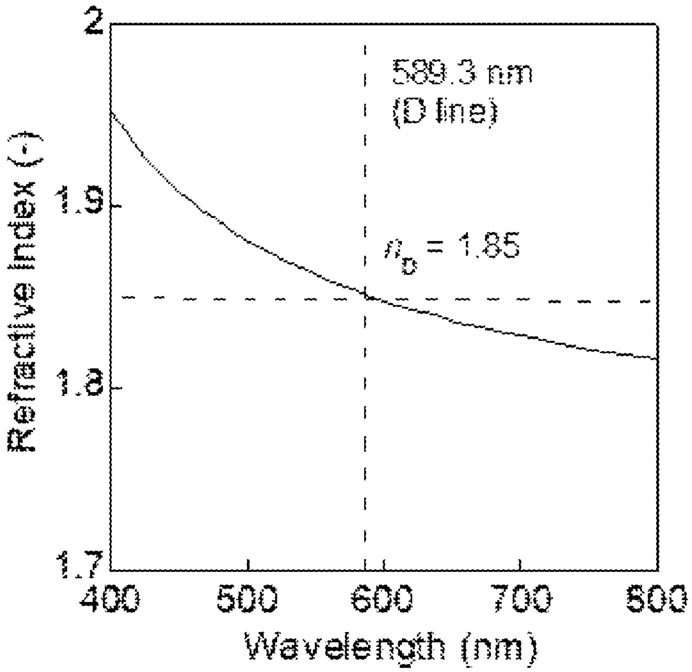
FIG. 13 is a graph showing measurement data of a refractive index of the P2 film of Example 9.

FIG. 12 shows the measurement data of the transmittance of the hydroxy-substituted PPS (P2) film determined by UV-vis. FIG. 13 shows the measurement data of the refractive index of the hydroxy-substituted PPS (P2) film.

The true densities of the dimethoxy-substituted PPS (P1) and hydroxy-substituted PPS (P2) were measured with a dry automatic densitometer (AccuPycII 1340, available from Shimadzu Corporation) and found to be 1.42 $g/cm^3$ and 1.87 $g/cm^3$, respectively. This presumably indicates that the intermolecular hydrogen bonds formed by the hydroxy groups in the side chains of the hydroxy-substituted PPS (P2) increase the interaction between the main chains, and the high density and low molecular volume contribute to the improvement of the refractive index.

Example 10

Impartment of Toughness by Cross-Linking of Vinyl-Substituted PPS

Three types of vinyl-substituted PPS (P3) were synthesized as in Example 8 using poly(3-methyl-1,4-phenylene sulfide) instead of poly(2,6-dimethyl-1,4-phenylene sulfide).

Each vinyl-substituted PPS (P3) was dissolved in 1,1,2,2-tetrachloroethane, the solution was passed through a membrane filter, and m-benzenedithiol was added to the filtrate, and the mixture was stirred to prepare a sulfur-containing polymer composition. The concentration of P3 was adjusted to 100 mg/mL, and m-benzenedithiol was added in an amount of 0.5 equivalent relative to the vinyl group. The sulfur-containing polymer composition in an amount of 1.5 mL was dropped onto a 1 cm×5 cm Teflon® plate, heated at 50° C. for 12 hours, at 100° C. for 2 hours, at 120° C. for 12 hours, and at 150° C. for 3 hours. Thus, a crosslinked film P3-BDTH (crosslinked body) was obtained. A chemical formula showing the cross-linking reaction is shown below. Table 11 shows the vinyl group ($CH{=}CH_2$) content and Br content of each vinyl-substituted PPS used, and the results of measurement of the thermophysical properties and dynamic viscoelasticity of each crosslinked body produced.

In Table 11, the $CH{=}CH_2$ (mol %) content and Br (mol %) content were determined by $^1$H-NMR. Tg[a]) was determined by DSC analysis. Tg[b]), G', G", and tan δ were determined by dynamic mechanical analysis (DMA).

[Chem. 21]

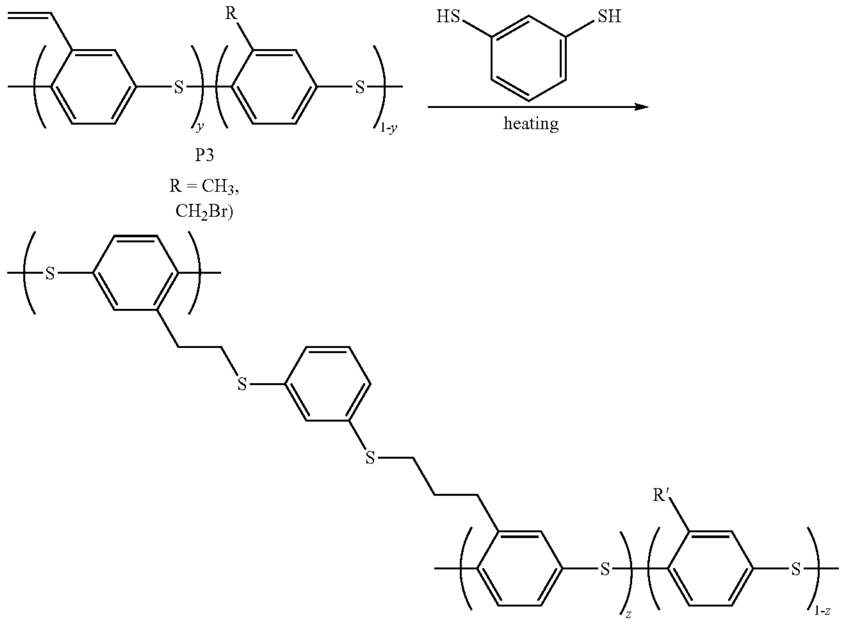

P3
R = $CH_3$,
$CH_2Br$)

P3-BDTH

TABLE 11

| | CH═CH2 (mol %) | Br (mol %) | Transmittance (%) (400 nm) | Tg (° C.)[a] | Tg (° C.)[b] | G' (40° C.) (GPa) | G" (40° C.) (MPa) | tanδ (40° C.) |
|---|---|---|---|---|---|---|---|---|
| Crosslinked body 1 | 4 | 1 | — | 104 | 99 | 1.79 | 138 | 0.077 |
| Crosslinked body 2 | 12 | 1 | 90 | 102 | 103 | 1.90 | 114 | 0.074 |
| Crosslinked body 3 | 72 | 20 | 77 | 118 | 110 | 1.07 | 74 | 0.069 |

Table 11 demonstrated that the prepared crosslinked bodies 1, 2, and 3 were all bendable and flexible.

The dynamic viscoelasticity of each of these crosslinked bodies was measured. The crosslinked body 2 had a storage elastic modulus G' of 1.90 GPa, which was the maximum among those of these crosslinked bodies.

Example 11

<Sulfur-Containing Polymer 9>

(Synthesis of Methyl Group-Terminated Methoxy-Substituted PPS (Me-OMePPS))

In a 100-mL two-necked flask, 0.6 g of methoxy-substituted PPS (OMePPS) (Mn=2500, disulfide concentration 0.24 mmol) was dissolved in THF (8.1 mL), the solution was cooled to 0° C., and iodomethane (299 μL, 4.8 mmol, 20 eq.) was added thereto, followed by stirring. When the solution became homogeneous, a dispersion of sodium borohydride (182 mg, 4.8 mmol, 20 eq.) in water (0.9 mL) was added dropwise thereto. After completion of foaming, the solution was heated to room temperature and reacted for three hours. After completion of the reaction, the solution was subjected to purification by precipitation in methanol (300 mL). The precipitates were collected with a glass filter, washed with methanol and water, and dried under reduced pressure to obtain methyl group-terminated methoxy-substituted PPS (Me-OMePPS) as white powder (0.47 g, yield 79%) (GPC (THF, polystyrene standard): Mn=2100, Mw/Mn=1.8).

In $^1$H-NMR analysis of the Me-OMePPS, a new peak derived from the terminal methyl group appeared around 2.4 to 2.1 ppm, and the number average molecular weight Mn was determined to be 2100 from the integral ratio of the peak derived from the methoxy group (4 to 3.3 ppm) and the peak derived from the terminal methyl group. The Mn was determined using the calculation equation: Mn=138.2 (repeating unit molecular weight)×AOMe (methoxy group-derived peak integrated value)/AMe (terminal methyl group-derived peak integrated value). In $^1$H-DOSY-NMR analysis, the peaks derived from the methoxy and methyl groups were observed on the same diffusion coefficient, confirming the addition of a methyl group to an end of the main chain.

[Chem. 22]

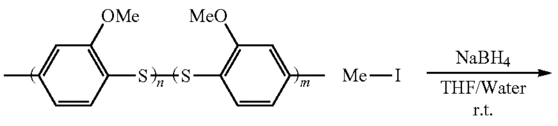

OMePPS

-continued

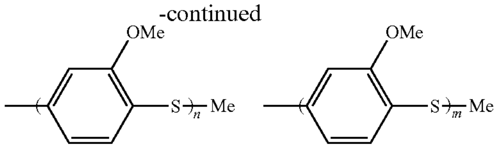

Me—OMePPS (Synthesis of Hydroxy-Substituted PPS (OHPPS))

[Chem. 23]

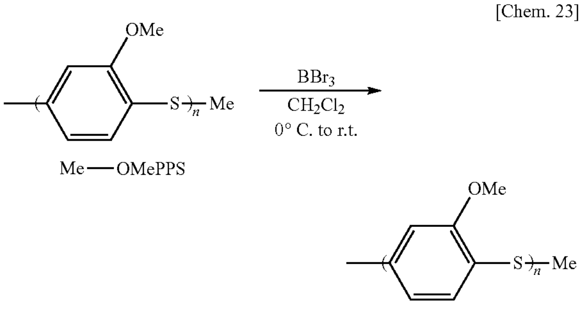

Me—OMePPS

OHPPS

A 100 mL flask was charged with 0.3 g of the Me-OMePPS and transferred to a glove box. Then, the Me-OMePPS was dissolved in dichloromethane (9.1 mL). The flask was sealed and taken out of the glove box, the solution was cooled to 0° C., and a 1 M solution of boron tribromide in dichloromethane (5.42 mL, 5.42 mmol) was added thereto with a syringe. The solution was stirred at 0° C. for 30 minutes, heated to room temperature, and stirred for 20 hours. After completion of the reaction, the solution was quenched by slowly adding dropwise pure water (12 mL) while cooling the flask in an ice bath. The solvent was removed using an evaporator. The remaining product was redissolved in DMF (10 mL) and subjected to purification by precipitation in 1 M hydrochloric acid (300 mL) to give white precipitates. The precipitates were collected with a glass filter, washed with water, and dried in a vacuum until the collected solids were completely dried. The product was redissolved in acetone (20 mL), the solution was subjected to purification by reprecipitation in 1 M hydrochloric acid (200 mL) (twice in total). The precipitates were collected with a glass filter, washed with water, and dried in a vacuum to form hydroxy-substituted PPS (OHPPS) (sulfur-containing polymer 9) as white powder (0.21 g, yield 79%) (Mn (determined by NMR)=2000).

In $^{1}$H-NMR analysis of the polymer, the peak derived from the methoxy group (4 to 3.3 ppm) disappeared after demethylation and a new broad peak derived from the hydroxyl group was observed in a range of 11 to 9.5 ppm, confirming the progress of the reaction. Since the integration ratio of the peak derived from the hydroxyl group to the peak derived from the aromatic ring was 1:1, the percentage of introduction of hydroxyl groups was calculated to be 100%. In IR analysis of the polymer, the absorption of the O—H stretching vibration (3400 cm$^{-1}$) was observed after the reaction, and the absorption of the C—O—C stretching vibration (1200 cm$^{-1}$) observed before the reaction disappeared. This supports the progress of the reaction. The absorption derived from the C—H stretching vibration of the methyl group (3000 to 2800 cm$^{-1}$) was significantly attenuated after the reaction, and the absorption derived from the Ar—H stretching vibration (3070 cm$^{-1}$) of the aromatic ring and the absorption derived from the C—H out-of-plane bending vibration (920 to 800 cm$^{-1}$) of the aromatic ring were observed even after the reaction. This supports the structure of OHPPS.

The XRD profiles of Me-OMePPS and OHPPS showed that no crystalline peak was observed even after demethylation. In Me-OMePPS and OHPPS, average distances between aromatic rings calculated from the Bragg equation were 4.5 Å and 4.2 Å (using CuKα line: 1.54 Å), respectively. In DSC analysis of the polymer, the glass transition point of Me-OMePPS was 119° C., whereas the glass transition point of OHPPS was improved to 125° C., indicating an increase in the interactions between molecular chains owing to the intermolecular hydrogen bonds.

Figure 14:
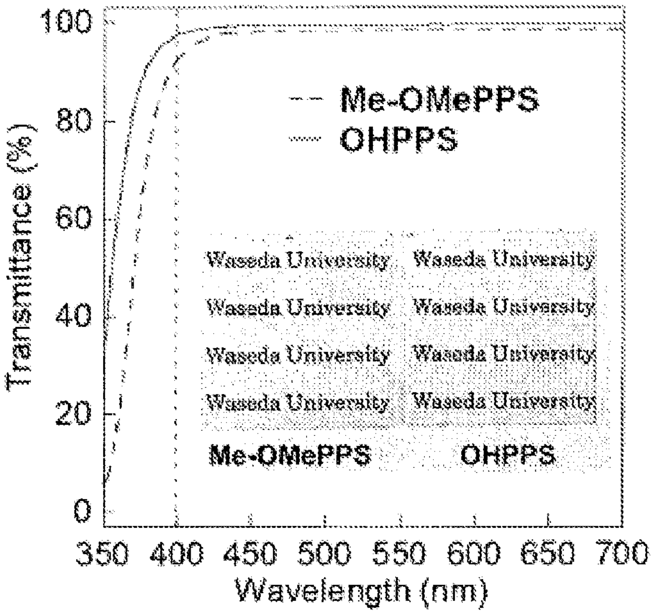
FIG. 14 is a graph showing measurement data of transmittances of OHPPS and Me-OMePPS.

Hydroxy-substituted PPS (OHPPS) was dissolved in DMF to prepare a solution having a concentration of 15 mg/mL, the solution was drop-cast onto a glass substrate, and dried under reduced pressure at 50° C. for 12 hours and at room temperature for 12 hours. Thus, a 4.5 μm-thick colorless and transparent thin film was obtained. Methyl group-terminated methoxy-substituted PPS (Me-OMePPS) was dissolved in N,N-dimethylacetamide (DMAc) to prepare a solution having a concentration of 15 mg/mL. The solution was drop-cast onto a glass substrate, and dried under reduced pressure at 50° C. for 12 hours and at room temperature for 12 hours. Thus, a 2.8-μm thick colorless and transparent thin film was obtained. The transmittance of each of the obtained two thin films was measured and converted into a transmittance at a thickness of 1 μm. FIG. 14 shows the measurement data of the transmittance of these thin films (converted into a transmittance at thickness of 1 μm). As shown in FIG. 14, OHPPS had a transmittance of 97%, which was higher than the transmittance of 93% of Me-OMePPS.

Figure 15:
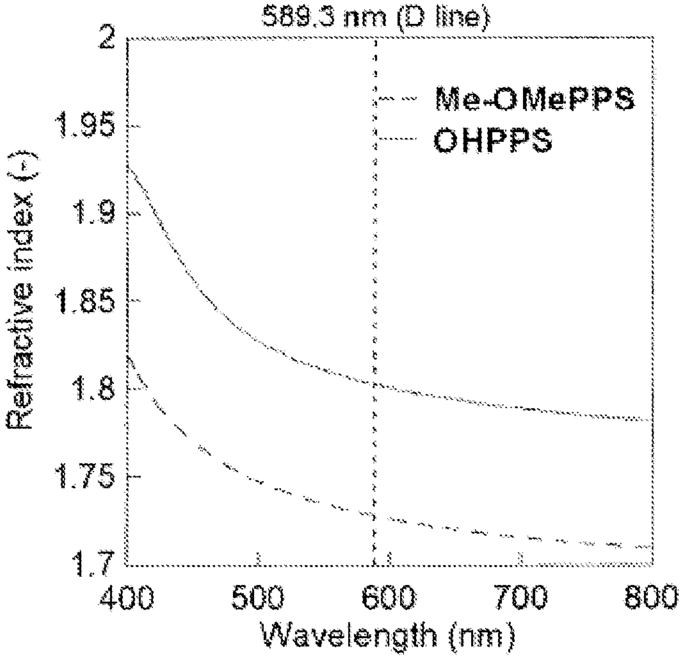
FIG. 15 is a graph showing measurement data of refractive indices of OHPPS and Me-OMePPS.

OHPPS (60 mg) was dissolved in DMF (1 mL), the solution was dropped onto a silicon wafer, and the wafer was rotated using a spin coater at 2000 rpm for 30 seconds. Thus, a film was formed as a sample. The sample was dried under reduced pressure at 50° C. for 12 hours and at room temperature for 12 hours to obtain a uniform thin film. Me-OMePPS (30 mg) was dissolved in 1,1,2,2-tetrachloroethane (1 mL), the solution was dropped onto a silicon wafer, the wafer was rotated using a spin coater at 500 rpm for 45 seconds and 1500 rpm for 50 seconds. Thus, a film was formed as a sample. The sample was dried under reduced pressure at 50° C. for 12 hours and at room temperature for 12 hours to obtain a uniform thin film. The refractive index (D line) and Abbe number of each thin film were measured. FIG. 15 shows measured refractive index data. Table 12 shows the measurement results.

Table 12 shows that OHPPS having a hydroxyl group has a higher refractive index and a smaller Abbe number than Me-OMePPS.

The true densities of Me-OMePPS and OHPPS were measured using a dry automatic densitometer (AccuPycII 1340, available from Shimadzu Corporation). Table 12 shows the measurement results. Since OHPPS had a higher true density than Me-OMePPS as shown in Table 12, presumably, the intermolecular hydrogen bonds formed by the hydroxy groups in the side chains of OHPPS increase the interaction between the main chains, and the high density and low molecular volume contribute to the improvement of the refractive index.

TABLE 12

| | $M_n$[a)] | $M_n$[b)] | $M_w$[b)] | $M_w/M_n$[b)] (—) | Tg[c)] (° C.) | $n_D$[d)] (—) | $v_D$[d)] (—) | Density[e)] ($g/cm^3$) |
|---|---|---|---|---|---|---|---|---|
| OMePPS | — | 2500 | 5300 | 2.1 | 123 | 1.73 | 22 | — |
| Me—OMePPS | 2100 | 2100 | 3800 | 1.8 | 119 | 1.73 | 22 | 1.47 |
| OHPPS | 2000 | — | — | — | 125 | 1.80 | 20 | 1.50 |

[a)]determined by $^1H$ NMR,
[b)]determined by GPC with THF solvent,
[c)]determined by DSC,
[d)]determined by ellipsometer,
[e)]determined by dry automatic densitometer

The invention claimed is:

1. A sulfur-containing polymer comprising:

a structural unit (B) represented by the following formula (2);

and a reactive functional group; and optionally further comprising, a structural unit (A) represented by the following formula (1), or a structural unit (C) represented by the following formula (3), or a combination thereof:

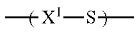

(1)

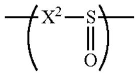

(2)

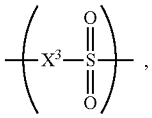

(3)

wherein $X^1$, $X^2$, and $X^3$ are the same as or different from each other and are each a substituted or an unsubstituted divalent aromatic hydrocarbon group, and a total content of the structural unit (B), the structural unit (A), and the structural unit (C) is 80 mol % or higher based on 100 mol % of all structural units of the sulfur-containing polymer.

2. The sulfur-containing polymer according to claim 1, wherein the sulfur-containing polymer comprises the structural unit (B) as a repeating unit.

3. The sulfur-containing polymer according to claim 1, wherein the reactive functional group is present in at least one of a main chain end or a side chain of the sulfur-containing polymer.

4. The sulfur-containing polymer according to claim 1, wherein the reactive functional group is at least one functional group selected from the group consisting of a carboxyl group, a phosphoric acid group, a phosphonic acid group, a hydroxy group, and a curable functional group, or a moiety comprising the at least one functional group.

5. The sulfur-containing polymer according to claim 1, wherein the substituent is selected from the group consisting of a reactive functional group, a halogen atom, an optionally substituted alkyl group, an optionally substituted alkoxy group, an optionally substituted aryl group, an optionally substituted aralkyl group, and an optionally substituted sulfur-containing substituent.

6. The sulfur-containing polymer according to claim 1, wherein a ratio of a content of an oxygen atom O attached to a sulfur atom S in a main chain of the sulfur-containing polymer to a content of the sulfur atom S in the main chain thereof (O/S) is in a range from 0.1 to 1.5.

7. The sulfur-containing polymer according to claim 1 wherein the sulfur-containing polymer is present in an optical product.

8. A sulfur-containing polymer composition comprising: the sulfur-containing polymer according to claim 1; and at least one material selected from the group consisting of an inorganic substance, a cross-linking agent, and an organic resin.

9. A cured product of the sulfur-containing polymer according to claim 1.

10. A cured product of the sulfur-containing polymer composition according to claim 8.

11. A method for producing the sulfur-containing polymer according to claim 1, the method comprising:

reacting a sulfur-containing aromatic polymer terminated with at least one group selected from the group consisting of a disulfide bond and a thiol group, with a compound having a polymerizable double bond and the reactive functional group.

* * * * *